US012581509B2

(12) United States Patent
Lee et al.

(10) Patent No.: US 12,581,509 B2
(45) Date of Patent: Mar. 17, 2026

(54) METHOD FOR SELECTING RESOURCE IN CONSIDERATION OF ACTIVE TIME RELATED TO SL DRX IN NR V2X

(71) Applicant: LG ELECTRONICS INC., Seoul (KR)

(72) Inventors: Seungmin Lee, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 321 days.

(21) Appl. No.: 18/271,403

(22) PCT Filed: Jan. 12, 2022

(86) PCT No.: PCT/KR2022/000545
§ 371 (c)(1),
(2) Date: Jul. 7, 2023

(87) PCT Pub. No.: WO2022/154466
PCT Pub. Date: Jul. 21, 2022

(65) Prior Publication Data
US 2024/0089993 A1 Mar. 14, 2024

Related U.S. Application Data

(60) Provisional application No. 63/136,628, filed on Jan. 12, 2021.

(51) Int. Cl.
*H04W 72/25* (2023.01)
*H04W 72/1263* (2023.01)
*H04W 72/541* (2023.01)

(52) U.S. Cl.
CPC ....... *H04W 72/25* (2023.01); *H04W 72/1263* (2013.01); *H04W 72/541* (2023.01)

(58) Field of Classification Search
CPC ............. H04W 72/25; H04W 72/1263; H04W 72/541; H04W 72/1221; H04W 92/18;
(Continued)

(56) References Cited

U.S. PATENT DOCUMENTS

2020/0029340 A1* 1/2020 He ....................... H04W 72/044
2020/0229171 A1* 7/2020 Khoryaev ............... H04W 4/40
(Continued)

OTHER PUBLICATIONS

OPPO, "The effect of DRX on resource selection", R1-2008241, 3GPP TSG RAN WG1 #103e, e-Meeting, Oct. 26-Nov. 13, 2020.
(Continued)

*Primary Examiner* — Dady Chery
(74) *Attorney, Agent, or Firm* — BRYAN CAVE LEIGHTON PAISNER LLP

(57) ABSTRACT

Proposed is a method for operation of a first device (100) in a wireless communication system. The method may comprise the steps of: determining a sensing window; determining a selection window to be included in an active time of a sidelink (SL) discontinuous reception (DRX) configuration related to an SL DRX operation of a second device (200); selecting a resource for SL transmission in the selection window on the basis of sensing performed in the sensing window; transmitting, to the second device (200), sidelink control information (SCI) for scheduling a physical sidelink shared channel (PSSCH) through a physical sidelink control channel (PSCCH) on the basis of the resource; and transmitting SL data to the second device (200) through the PSSCH on the basis of the resource.

8 Claims, 17 Drawing Sheets

(58) Field of Classification Search
CPC ....... H04W 4/40; H04W 72/02; H04W 76/28; H04W 72/0446; H04W 72/543; H04W 72/569
See application file for complete search history.

(56) References Cited

U.S. PATENT DOCUMENTS

| | | | |
|---|---|---|---|
| 2020/0304159 A1* | 9/2020 | Liao | H04J 11/0036 |
| 2023/0066041 A1* | 3/2023 | Guo | H04W 52/0216 |
| 2023/0276526 A1* | 8/2023 | Shin | H04W 76/23 |
| | | | 370/329 |

OTHER PUBLICATIONS

Huawei, Hisilicon, "Physical layer impacts of sidelink DRX", R1-2006402, 3GPP TSG RAN WG1 #102e, E-meeting, Aug. 17-28, 2020.

Vivo, "Discussion on sidelink DRX", R1-2007690, 3GPP TSG RAN WG1 #103e, e-Meeting, Oct. 26-Nov. 13, 2020.

Vivo, "Resource allocation for sidelink power saving", R1-2007688, 3GPP TSG RAN WG1 #103e, e-Meeting, Oct. 26-Nov. 13, 2020.

* cited by examiner

BS(e.g. eNB or gNB)

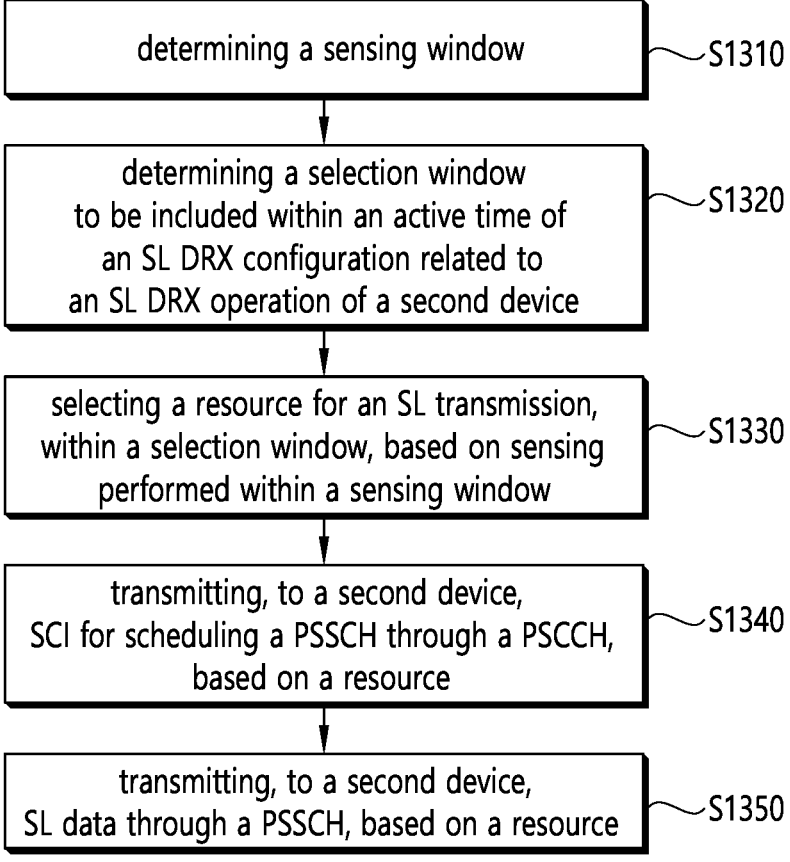

determining a sensing window — S1310 determining a selection window
to be included within an active time of
an SL DRX configuration related to
an SL DRX operation of a second device — S1320 selecting a resource for an SL transmission,
within a selection window, based on sensing
performed within a sensing window — S1330 transmitting, to a second device,
SCI for scheduling a PSSCH through a PSCCH,
based on a resource — S1340 transmitting, to a second device,
SL data through a PSSCH, based on a resource — S1350

FIG. 14

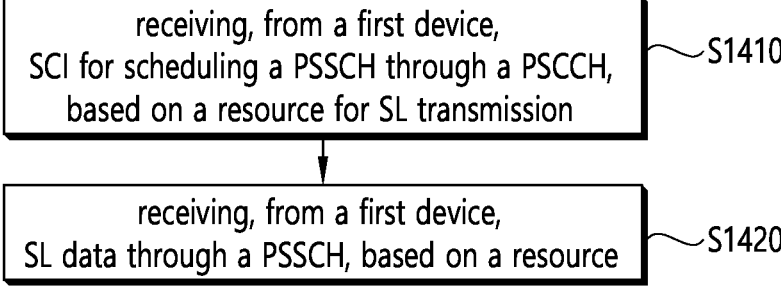

receiving, from a first device,
SCI for scheduling a PSSCH through a PSCCH,
based on a resource for SL transmission — S1410 receiving, from a first device,
SL data through a PSSCH, based on a resource — S1420

FIG. 18

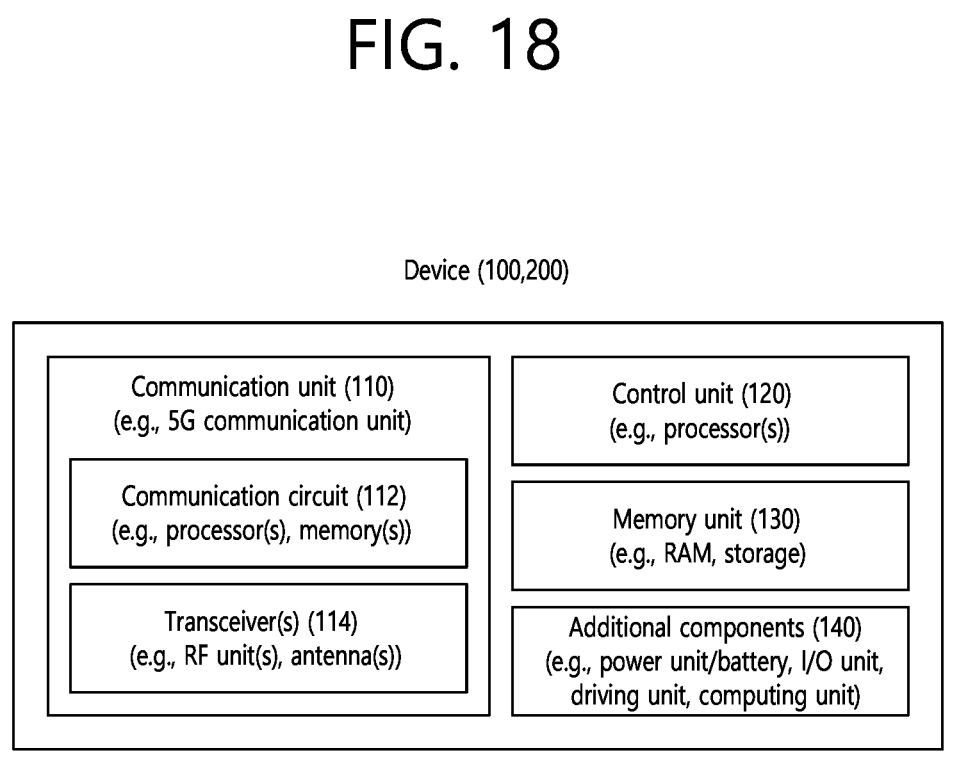

Device (100,200)

Communication unit (110)
(e.g., 5G communication unit)

Communication circuit (112)
(e.g., processor(s), memory(s))

Transceiver(s) (114)
(e.g., RF unit(s), antenna(s))

Control unit (120)
(e.g., processor(s))

Memory unit (130)
(e.g., RAM, storage)

Additional components (140)
(e.g., power unit/battery, I/O unit,
driving unit, computing unit)

FIG. 20

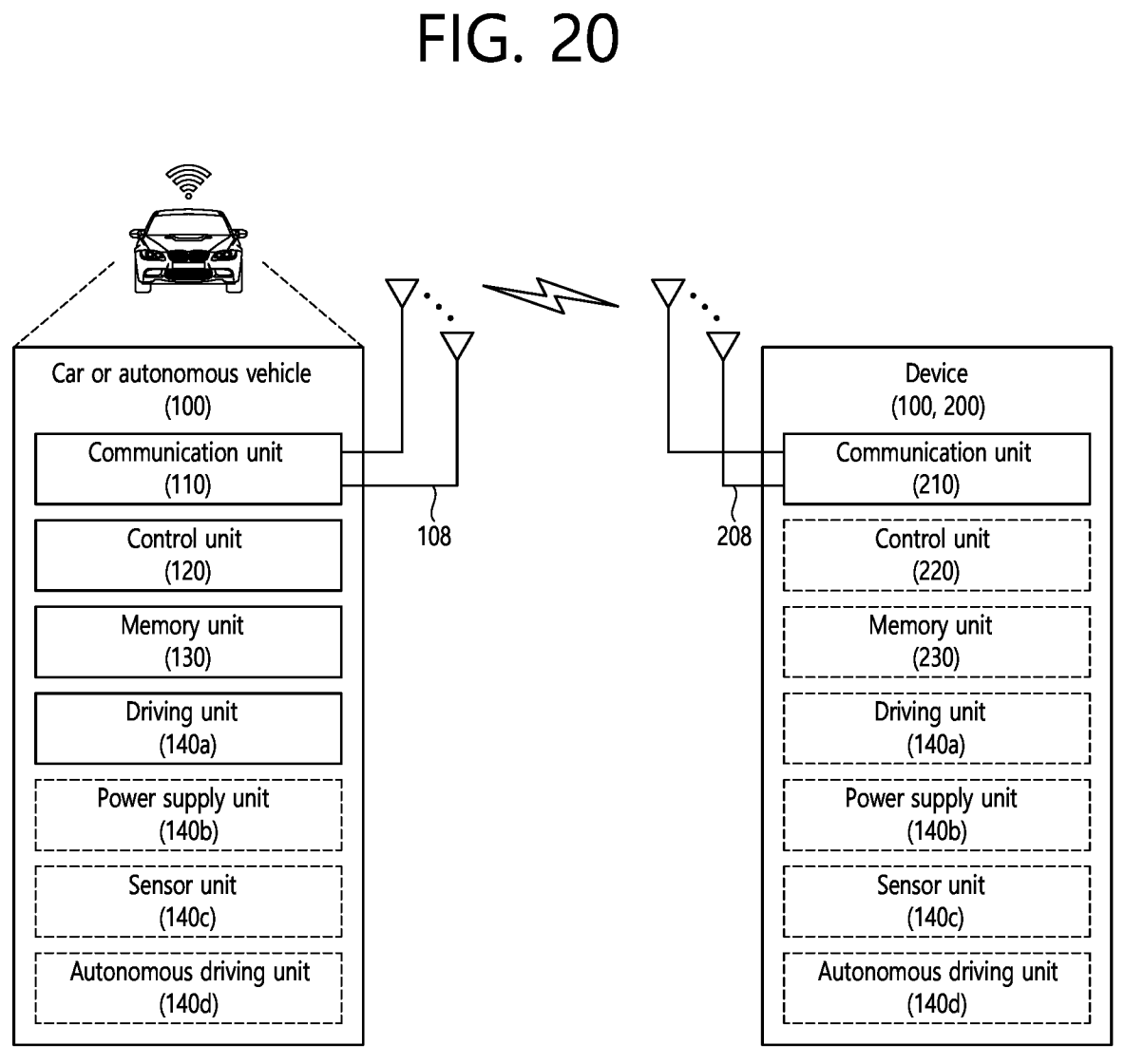

Device
(100, 200)

Communication unit
(210)

Control unit
(220)

Memory unit
(230)

Driving unit
(140a)

Power supply unit
(140b)

Sensor unit
(140c)

Autonomous driving unit
(140d)

208

Car or autonomous vehicle
(100)

Communication unit
(110)

Control unit
(120)

Memory unit
(130)

Driving unit
(140a)

Power supply unit
(140b)

Sensor unit
(140c)

Autonomous driving unit
(140d)

108

METHOD FOR SELECTING RESOURCE IN CONSIDERATION OF ACTIVE TIME RELATED TO SL DRX IN NR V2X

CROSS-REFERENCE TO RELATED APPLICATIONS

This application is the National Stage filing under 35 U.S.C. 371 of International Application No. PCT/KR2022/000545, filed on Jan. 12, 2022, which claims the benefit of U.S. Provisional Applications No. 63/136,628 filed on Jan. 12, 2021, which is hereby incorporated by a reference herein in its entirety.

TECHNICAL FIELD

This disclosure relates to a wireless communication system.

BACKGROUND

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

Thereafter, regarding V2X communication, various V2X scenarios are proposed in NR. For example, the various V2X scenarios may include vehicle platooning, advanced driving, extended sensors, remote driving, or the like.

SUMMARY

In an embodiment, an operation method of a first device 100 in a wireless communication system is proposed. The method may comprise: determining a sensing window; determining a selection window to be included within an active time of a sidelink (SL) discontinuous reception (DRX) configuration related to an SL DRX operation of a second device 200; selecting a resource for an SL transmission, within the selection window, based on sensing performed within the sensing window; transmitting, to the second device 200, sidelink control information (SCI) for scheduling a physical sidelink shared channel (PSSCH) through a physical sidelink control channel (PSCCH), based on the resource; and transmitting, to the second device 200, SL data through the PSSCH, based on the resource.

The user equipment (UE) can efficiently perform SL communication.

BRIEF DESCRIPTION OF THE DRAWINGS

FIG. 3 shows a radio protocol architecture, based on an embodiment of the present disclosure.

FIG. 5 shows a structure of a slot of an NR frame, based on an embodiment of the present disclosure.

FIG. 13 shows a procedure for a first device to perform wireless communication, according to an embodiment of the present disclosure.

FIG. 14 shows a procedure for a second device to perform wireless communication based on a sidelink (SL) discontinuous reception (DRX) configuration, according to an embodiment of the present disclosure.

FIG. 18 shows another example of a wireless device, based on an embodiment of the present disclosure.

FIG. 20 shows a vehicle or an autonomous vehicle, based on an embodiment of the present disclosure.

DETAILED DESCRIPTION

Figure 1:
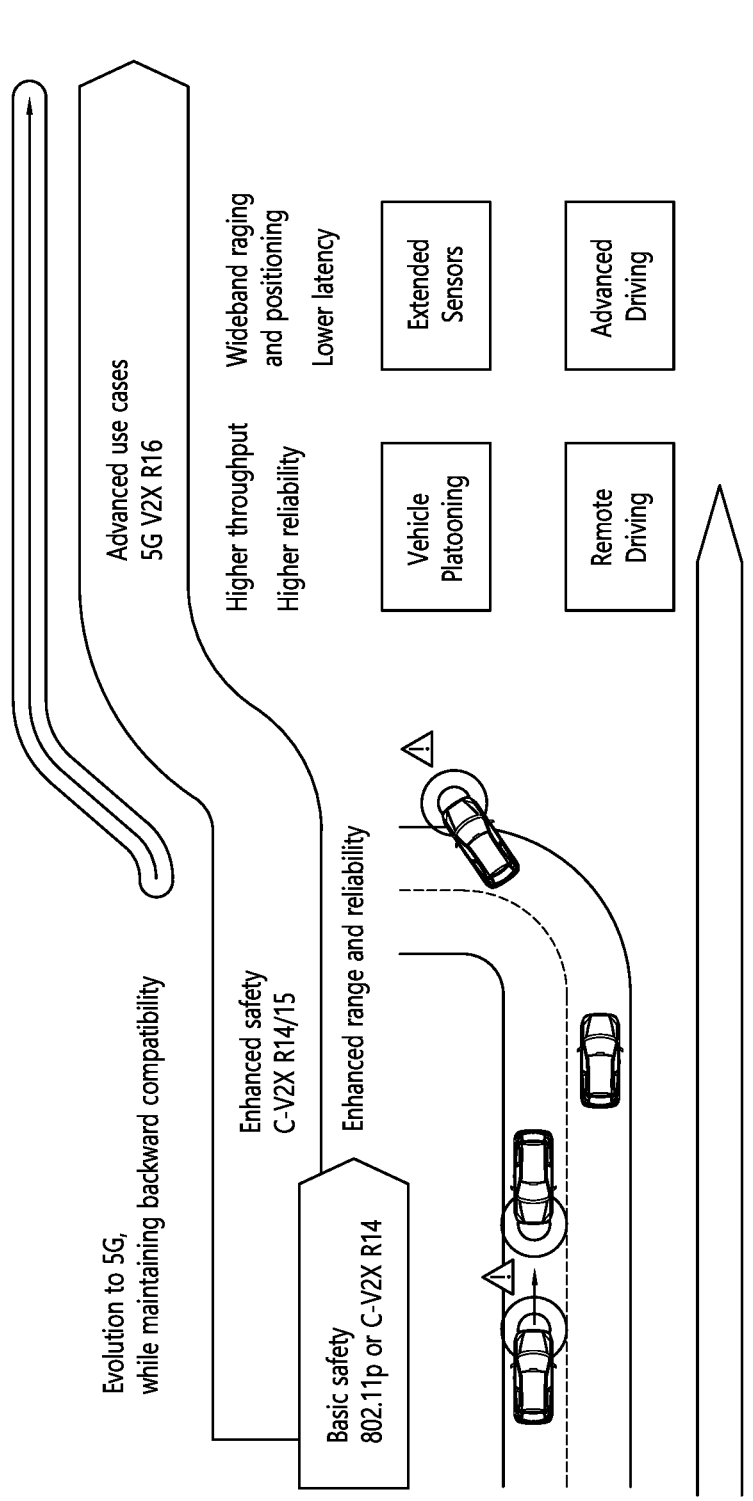
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
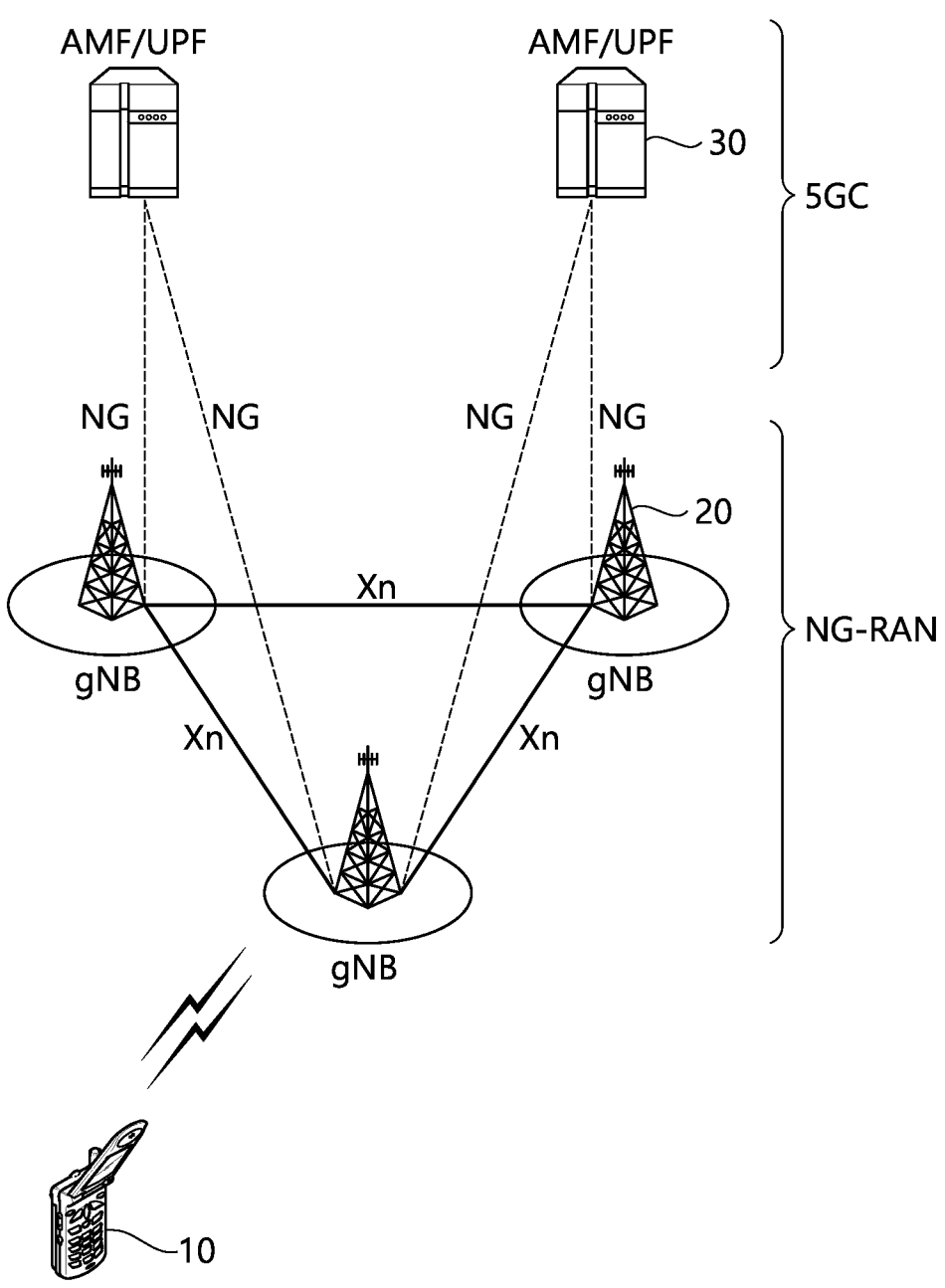
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BS s 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 3:
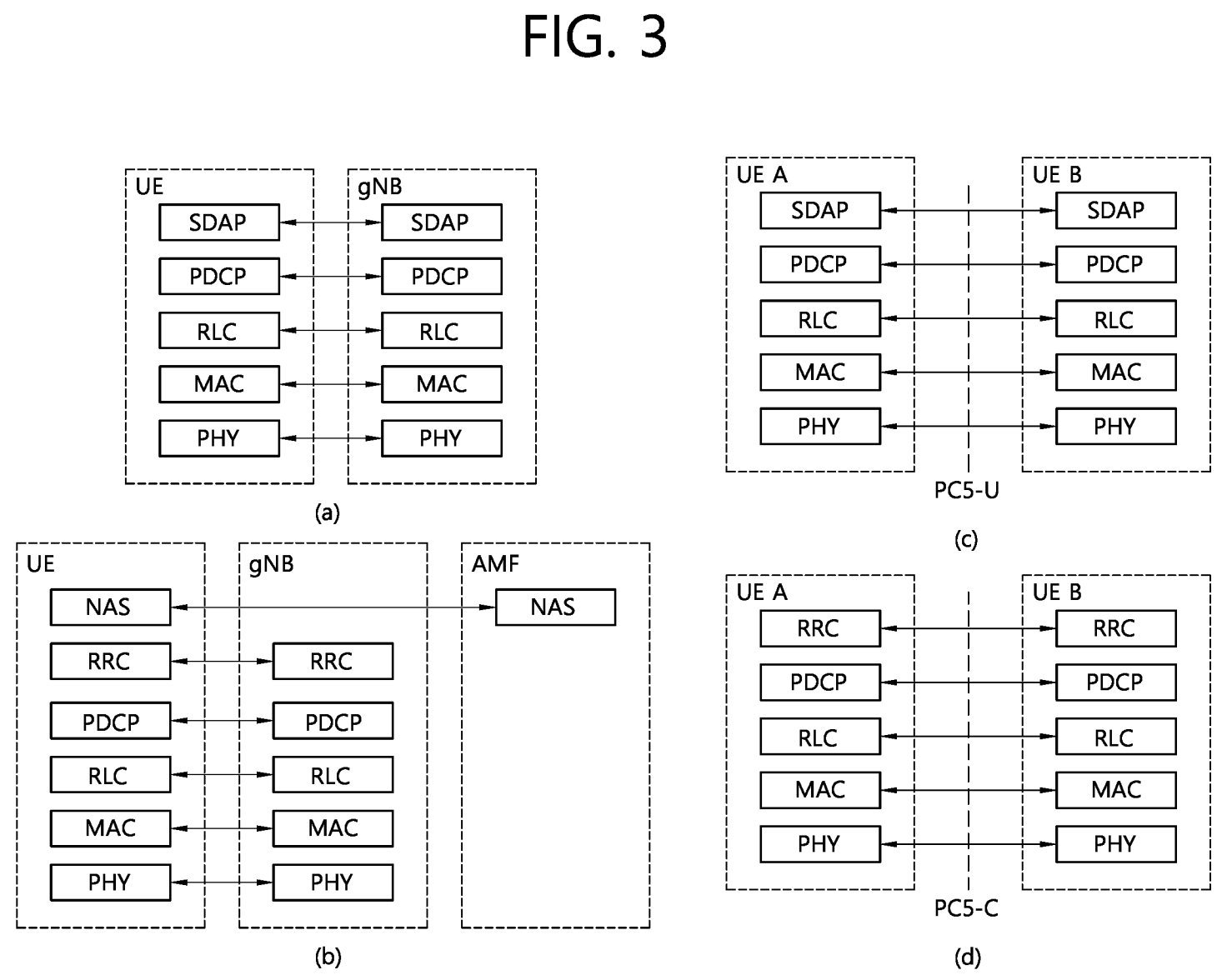

FIG. 3 shows a radio protocol architecture, based on an embodiment of the present disclosure. The embodiment of FIG. 3 may be combined with various embodiments of the present disclosure. Specifically, (a) of FIG. 3 shows a radio protocol stack of a user plane for Uu communication, and (b) of FIG. 3 shows a radio protocol stack of a control plane for Uu communication. (c) of FIG. 3 shows a radio protocol stack of a user plane for SL communication, and (d) of FIG. 3 shows a radio protocol stack of a control plane for SL communication.

Referring to FIG. 3, a physical layer provides an upper layer with an information transfer service through a physical channel. The physical layer is connected to a medium access control (MAC) layer which is an upper layer of the physical layer through a transport channel Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 4:
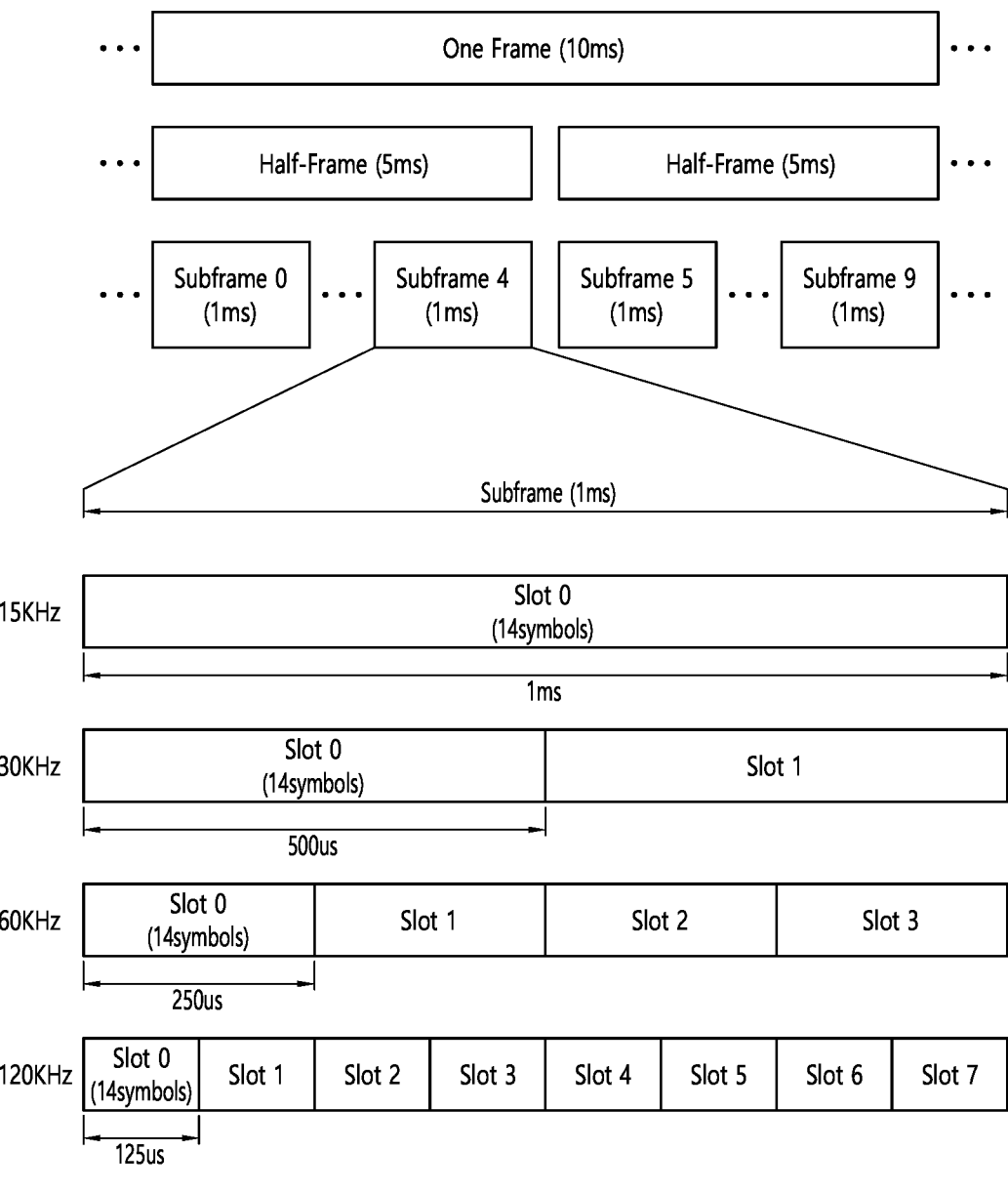
FIG. 4 shows a structure of a radio frame of an NR, based on an embodiment of the present disclosure.

FIG. 4 shows a structure of a radio frame of an NR, based on an embodiment of the present disclosure. The embodiment of FIG. 4 may be combined with various embodiments of the present disclosure.

Referring to FIG. 4, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS (15 * $2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS (15 * $2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or interval) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 5:
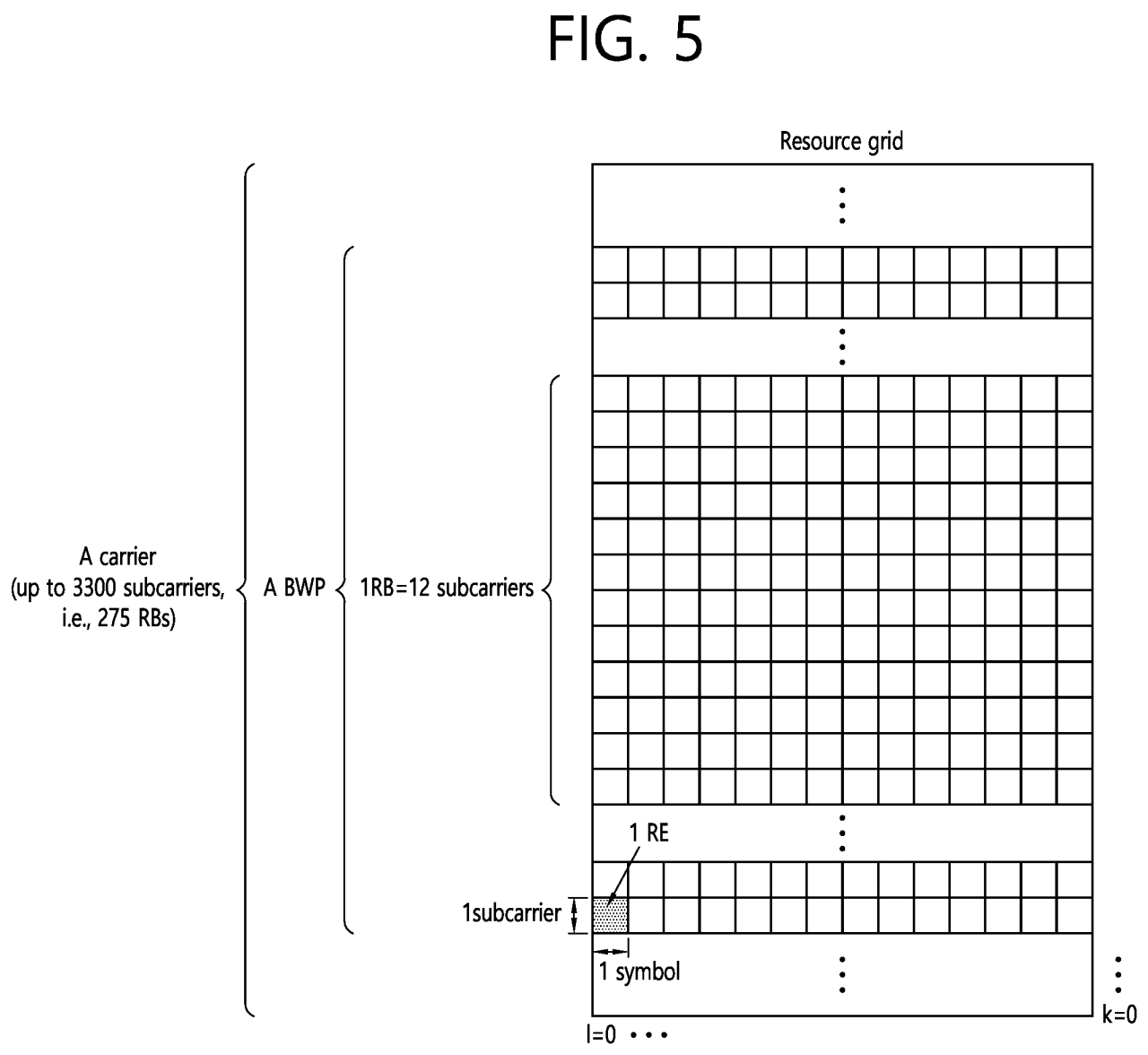

FIG. 5 shows a structure of a slot of an NR frame, based on an embodiment of the present disclosure. The embodiment of FIG. 5 may be combined with various embodiments of the present disclosure.

Referring to FIG. 5, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols. A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information—reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORE-SET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 6:
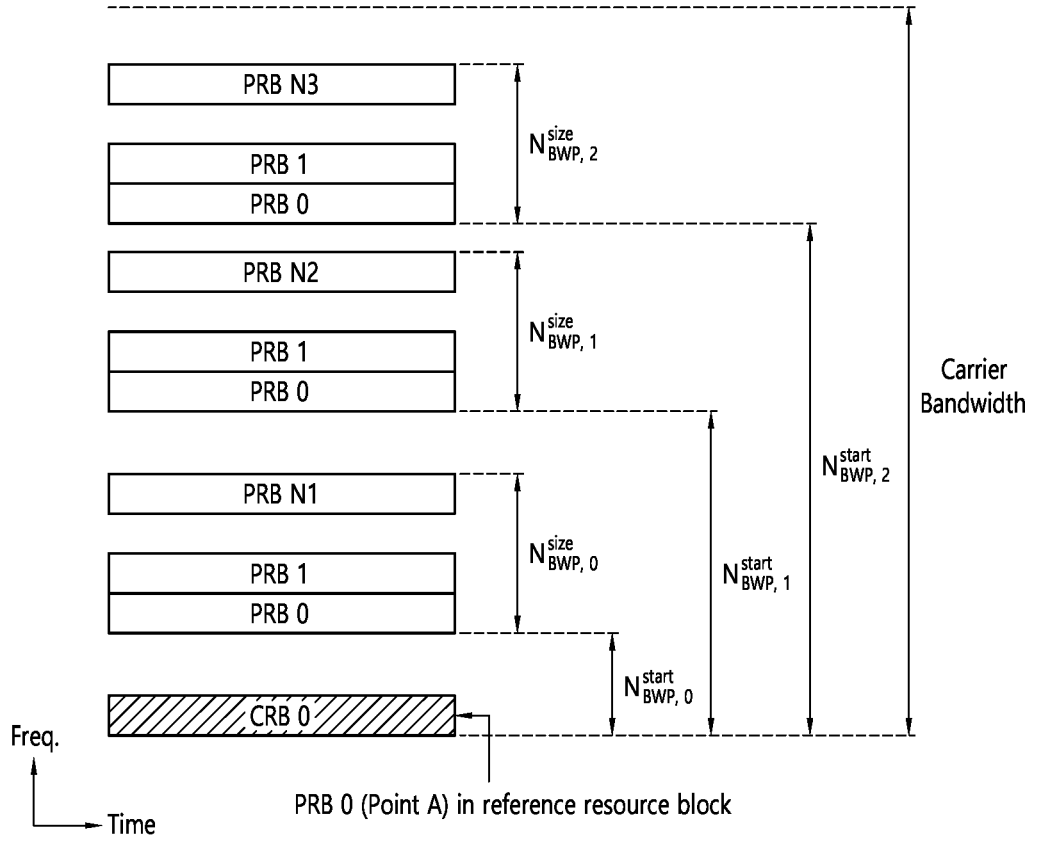
FIG. 6 shows an example of a BWP, based on an embodiment of the present disclosure.

FIG. 6 shows an example of a BWP, based on an embodiment of the present disclosure. The embodiment of FIG. 6 may be combined with various embodiments of the present disclosure. It is assumed in the embodiment of FIG. 6 that the number of BWPs is 3.

Referring to FIG. 6, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 7:
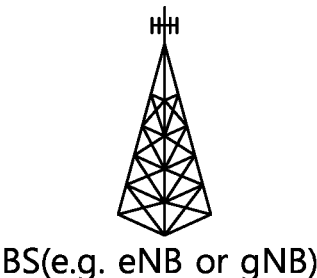
FIG. 7 shows a UE performing V2X or SL communication, based on an embodiment of the present disclosure.

FIG. 7 shows a UE performing V2X or SL communication, based on an embodiment of the present disclosure. The embodiment of FIG. 7 may be combined with various embodiments of the present disclosure.

Referring to FIG. 7, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 8:
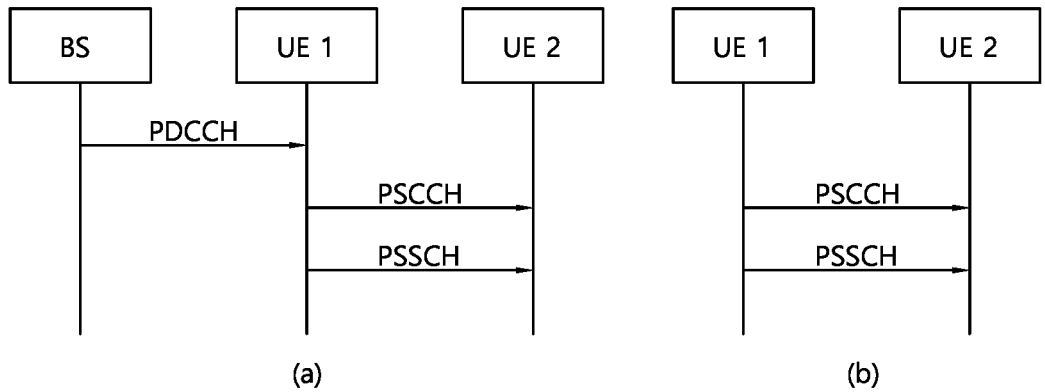
FIG. 8 shows a procedure of performing V2X or SL communication by a UE based on a transmission mode, based on an embodiment of the present disclosure.

FIG. 8 shows a procedure of performing V2X or SL communication by a UE based on a transmission mode, based on an embodiment of the present disclosure. The embodiment of FIG. 8 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 8 shows a UE operation related to an LTE transmission mode 1 or an LTE transmission mode 3. Alternatively, for example, (a) of FIG. 8 shows a UE operation related to an NR resource allocation mode 1. For example, the LTE transmission mode 1 may be applied to general SL communication, and the LTE transmission mode 3 may be applied to V2X communication.

For example, (b) of FIG. 8 shows a UE operation related to an LTE transmission mode 2 or an LTE transmission mode 4. Alternatively, for example, (b) of FIG. 8 shows a UE operation related to an NR resource allocation mode 2.

Referring to (a) of FIG. 8, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (e.g., downlink control information (DCI)) or RRC signaling (e.g., Configured Grant Type 1 or Configured Grant Type 2), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to (b) of FIG. 8, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

For example, the UE may assist the SL resource selection for another UE. For example, in the NR resource allocation mode 2, the UE may be provided/allocated with a configured grant for SL transmission. For example, in the NR resource allocation mode 2, the UE may schedule SL transmission of another UE. For example, in the NR resource allocation mode 2, the UE may reserve an SL resource for blind retransmission.

For example, in the NR resource allocation mode 2, the UE 1 may use the SCI to indicate a priority of SL transmission to the UE 2. For example, the UE 2 may decode the SCI, and the UE 2 may perform sensing and/or resource (re)selection on the basis of the priority. For example, the resource (re)selection procedure may include a step in which the UE 2 identifies a candidate resource in a resource selection window and a step in which the UE 2 selects a resource for (re)transmission among the identified candidate resources. For example, the resource selection window may be a time interval for selecting a resource for SL transmission by the UE. For example, after the UE 2 triggers resource (re)selection, the resource selection window may start at $T1 \geq 0$, and the resource selection window may be restricted by a remaining packet delay budget of the UE 2. For example, in the step in which the UE 2 identifies the candidate resource in the resource selection window, if a specific resource is indicated by the SCI received by the UE 2 from the UE 1 and if an L1 SL RSRP threshold for the specific resource exceeds an SL RSRP threshold, the UE 2 may not determine the specific resource as the candidate resource. For example, the SL RSRP threshold may be determined based on a priority of SL transmission indicated by the SCI received by the UE 2 from the UE 1 and a priority of SL transmission on a resource selected by the UE 2.

For example, the L1 SL RSRP may be measured based on an SL demodulation reference signal (DMRS). For example, one or more PSSCH DMRS patterns may be configured or pre-configured in a time domain for each resource pool. For example, a PDSCH DMRS configuration type 1 and/or type 2 may be identical or similar to a frequency domain pattern of the PSSCH DMRS. For example, a correct DMRS pattern may be indicated by the SCI. For example, in the NR resource allocation mode 2, the transmitting UE may select a specific DMRS pattern from among configured or pre-configured DMRS patterns for the resource pool.

For example, in the NR resource allocation mode 2, the transmitting UE may perform initial transmission of a transport block (TB) without reservation, based on the sensing and resource (re)selection procedure. For example, the transmitting UE may use an SCI related to a first/initial RB to reserve an SL resource for initial transmission of a second TB, based on the sensing and resource (re)selection procedure.

For example, in the NR resource allocation mode 2, the UE may reserve a resource for feedback-based PSSCH retransmission, through signaling related to previous transmission of the same TB. For example, the maximum number of SL resources reserved by one transmission including current transmission may be 2, 3, or 4. For example, the maximum number of SL resources may be identical irrespective of whether HARQ feedback is enabled. For example, the maximum number of HARQ (re)transmissions for one TB may be restricted by a configuration or a pre-configuration. For example, the maximum number of HARQ (re)transmissions may be up to 32. For example, in the absence of the configuration or the pre-configuration, the maximum number of HARQ (re)transmissions may not be designated. For example, the configuration or the pre-configuration may be for the transmitting UE. For example, in the NR resource allocation mode 2, HARQ feedback for releasing a resource not used by the UE may be supported.

For example, in the NR resource allocation mode 2, the UE may use the SCI to indicate to another UE one or more sub-channels and/or slots used by the UE. For example, the UE may use the SCI to indicate to another UE one or more sub-channels and/or slots reserved by the UE for PSSCH (re)transmission. For example, a minimum allocation unit of an SL resource may be a slot. For example, a size of a sub-channel may be configured for the UE or may be pre-configured.

Hereinafter, a sidelink control information (SCI) will be described.

Control information transmitted by a BS to a UE through a PDCCH may be referred to as downlink control information (DCI), whereas control information transmitted by the UE to another UE through a PSCCH may be referred to as SCI. For example, the UE may know in advance a start symbol of the PSCCH and/or the number of symbols of the PSCCH, before decoding the PSCCH. For example, the SCI may include SL scheduling information. For example, the UE may transmit at least one SCI to another UE to schedule the PSSCH. For example, one or more SCI formats may be defined.

For example, a transmitting UE may transmit the SCI to a receiving UE on the PSCCH. The receiving UE may decode one SCI to receive the PSSCH from the transmitting UE.

For example, the transmitting UE may transmit two consecutive SCIs (e.g., 2-stage SCI) to the receiving UE on the PSCCH and/or the PSSCH. The receiving UE may decode the two consecutive SCIs (e.g., 2-stage SCI) to receive the PSSCH from the transmitting UE. For example, if SCI configuration fields are divided into two groups in consideration of a (relatively) high SCI payload size, an SCI including a first SCI configuration field group may be referred to as a first SCI or a $1^{st}$ SCI, and an SCI including a second SCI configuration field group may be referred to as a second SCI or a $2^{nd}$ SCI. For example, the transmitting UE may transmit the first SCI to the receiving UE through the PSCCH. For example, the transmitting UE may transmit the second SCI to the receiving UE on the PSCCH and/or the PSSCH. For example, the second SCI may be transmitted to the receiving UE through an (independent) PSCCH, or may be transmitted in a piggyback manner together with data through the PSSCH. For example, two consecutive SCIs may also be applied to different transmissions (e.g., unicast, broadcast, or groupcast).

For example, the transmitting UE may transmit the entirety or part of information described below to the receiving UE through the SCI. Herein, for example, the transmitting UE may transmit the entirety or part of the information described below to the receiving UE through the first SCI and/or the second SCI.

PSSCH and/or PSCCH related resource allocation information, e.g., the number/positions of time/frequency resources, resource reservation information (e.g., period), and/or SL CSI report request indicator or SL (L1) RSRP (and/or SL (L1) RSRQ and/or SL (L1) RSSI) report request indicator, and/or SL CSI transmission indicator (or SL (L1) RSRP (and/or SL (L1) RSRQ and/or SL (L1) RSSI) information transmission indicator)) (on PSSCH), and/or MCS information, and/or Transmit power information, and/or L1 destination ID information and/or L1 source ID information, and/or SL HARQ process ID information, and/or New data indicator (NDI) information, and/or Redundancy version (RV) information, and/or (Transmission traffic/packet related) QoS information, e.g., priority information, and/or SL CSI-RS transmission indicator or information on the number of (to-be-transmitted) SL CSI-RS antenna ports, and/or Location information of a transmitting UE or location (or distance region) information of a target receiving UE (for which SL HARQ feedback is requested), and/or Reference signal (e.g., DMRS, etc.) related to channel estimation and/or decoding of data to be transmitted through a PSSCH, e.g., information related to a pattern of a (time-frequency) mapping resource of DMRS, rank information, antenna port index information For example, the first SCI may include information related to channel sensing. For example, the receiving UE may decode the second SCI by using a PSSCH DMRS. A polar code used in a PDCCH may be applied to the second SCI. For example, in a resource pool, a payload size of the first SCI may be identical for unicast, groupcast, and broadcast. After decoding the first SCI, the receiving UE does not have to perform blind decoding of the second SCI. For example, the first SCI may include scheduling information of the second SCI.

Meanwhile, in various embodiments of the present disclosure, since a transmitting UE may transmit at least one of a SCI, a first SCI, and/or a second SCI to a receiving UE through a PSCCH, the PSCCH may be replaced/substituted with at least one of the SCI, the first SCI and/or the second SCI. Additionally/alternatively, for example, the SCI may be replaced/substituted with at least one of the PSCCH, the first SCI, and/or the second SCI. Additionally/alternatively, for example, since a transmitting UE may transmit a second SCI to a receiving UE through a PSSCH, the PSSCH may be replaced/substituted with the second SCI.

Figure 9:
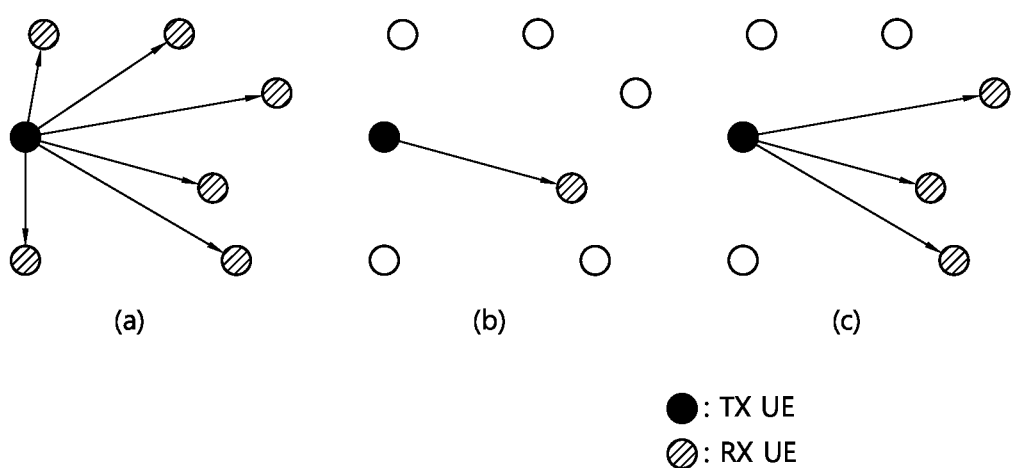
FIG. 9 shows three cast types, based on an embodiment of the present disclosure.

FIG. 9 shows three cast types, based on an embodiment of the present disclosure. The embodiment of FIG. 9 may be combined with various embodiments of the present disclosure. Specifically, (a) of FIG. 9 shows broadcast-type SL communication, (b) of FIG. 9 shows unicast type-SL communication, and (c) of FIG. 9 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hereinafter, power saving will be described.

As a power saving technique of at UE, UE adaptation to traffic and power consumption characteristics, adaptation according to frequency/time change, adaptation to antenna, adaptation to discontinuous reception (DRX) configuration, adaptation to UE processing capability, adaptation for reduction of PDCCH monitoring/decoding, power saving signal/channel/procedure for triggering adaptation to UE power consumption, power consumption reduction in RRM measurement, etc. may be considered.

Hereinafter, discontinuous reception (DRX), which is one of techniques capable of realizing UE power saving, will be described.

The procedure of a DRX-related UE can be summarized as shown in Table 5 below.

TABLE 5

|  | Type of signals | UE procedure |
|---|---|---|
| Step 1 | RRC signaling (MAC-CellGroupConfig) | receive DRX configuration information |
| Step 2 | MAC CE((Long) DRX command MAC CE) | receive DRX command |
| Step 3 |  | monitor PDCCH during on-duration of DRX period |

Figure 10:
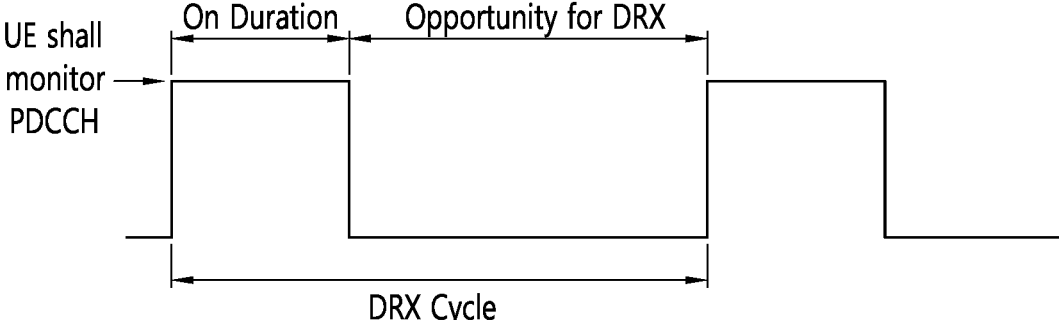
FIG. 10 shows an example of a DRX cycle according to an embodiment of the present disclosure.

FIG. 10 shows an example of a DRX cycle according to an embodiment of the present disclosure. The embodiment of FIG. 10 may be combined with various embodiments of the present disclosure.

Referring to FIG. 10, a UE uses DRX in RRC_IDLE state and RRC_INACTIVE state to reduce power consumption. When DRX is configured, a UE performs DRX operation according to DRX configuration information. A UE operating as DRX repeatedly turns on and off the reception task.

For example, when DRX is configured, a UE attempts to receive a downlink channel PDCCH only within a pre-configured time interval, and does not attempt to receive the PDCCH within the remaining time interval. The time period during which a UE should attempt to receive a PDCCH is called on-duration, and the on-duration period is defined once per DRX cycle.

A UE may receive DRX configuration information from a gNB through RRC signaling, and may operate as DRX through reception of a (long) DRX command MAC CE.

DRX configuration information may be included in MAC-CellGroupConfig. The IE, MAC-CellGroupConfig, may be used to configure MAC parameters for a cell group, including DRX.

A DRX command MAC CE or long DRX command MAC CE is identified by a MAC PDU subheader with a logical channel ID (LCID). It has a fixed size of 0 bits.

Table 6 below shows a value of LCID for DL-SCH.

TABLE 6

| Index | LCID values |
|---|---|
| 111011 | Long DRX Command |
| 111100 | DRX Command |

The PDCCH monitoring operation of a UE is controlled by DRX and Bandwidth Adaptation (BA). On the other hand, when DRX is configured, a UE does not need to continuously monitor a PDCCH. On the other hand, DRX has the following characteristics.

on-duration: This is a period in which a UE waits to receive the next PDCCH after waking up. If a UE successfully decodes a PDCCH, the UE maintains the awake state and starts an inactivity-timer.

an inactive timer: This is a time interval in which a UE waits for successful PDCCH decoding from the last successful PDCCH decoding, and it is a period in which the UE sleeps again in case of failure. A UE must restart an inactivity timer after a single successful decoding of a PDCCH for the only first transmission (i.e., not for retransmission).

a retransmission timer: A time interval during which a retransmission is expected.

a cycle: It defines the periodic repetition of on-duration and subsequent possible periods of inactivity.

Hereinafter, DRX in a MAC layer will be described. Hereinafter, a MAC entity may be expressed as a UE or a MAC entity of a UE.

A MAC entity may be configured by RRC with DRX function for controlling a PDCCH monitoring activity of a UE for a radio network temporary identifier (C-RNTI), CS-RNTI, TPC-PUCCH-RNTI, TPC-PUSCH-RNTI, and TPC-SRS-RNTI of the MAC entity. When using DRX operation, a MAC entity must monitor a PDCCH. In the RRC_CONNECTED state, if DRX is configured, a MAC

16 ful reception of a random access response to a random access preamble not selected by the MAC entity among contention-based random access preambles.

When DRX is configured, a UE must follow a procedure below.

---

1> if a MAC PDU is transmitted in a configured uplink grant
2> start the drx-HARQ-RTT-TimerUL for the corresponding HARQ process after the first reception of the corresponding PUSCH transmission;
2> stop the drx-RetransmissionTimerUL for the corresponding HARQ process.
1> if a drx-HARQ-RTT-TimerDL expires:
2> if the data of the corresponding HARQ process was not successfully decoded:
3> start the drx-RetransmissionTimerDL for the corresponding HARQ process.
1> if a drx-HARQ-RTT-TimerUL expires :
2> start the drx-RetransmissionTimerUL for the corresponding HARQ process.
1> if a DRX Command MAC CE or a Long DRX Command MAC CE is received:
2> stop drx-onDurationTimer;
2> stop drx-InactivityTimer.
1> if drx-InactivityTimer expires or a DRX Command MAC CE is received:
2> if the Short DRX cycle is configured:
3> start of restart drx-ShortCycleTimer;
3> use the Short DRX Cycle.
2> else:
3> use the Long DRX cycle.
1> if drx-ShortCycleTimer expires:
2> use the Long DRX cycle.
1> if a Long DRX Command MAC CE is received:
2> stop drx-ShortCycleTimer;
2> use the Long DRX cycle.
1> if the Short DRX Cycle is used, and [(SFN × 10) + subframe number] modulo (drx-ShortCycle) = (drx-StartOffset) modulo (drx-ShortCycle); or
1> if the Long DRX Cycle is used, and [(SFN × 10) + subframe number] modulo (drx-LongCycle) = drx-StartOffset:
2> if drx-SlotOffset is configured:
3> start drx-onDurationTimer after drx-SlotOffset.
2> else:
3> start drx-onDurationTimer.
1> if the MAC entity is in Active Time:
2> monitor the PDCCH;
2> if the PDCCH indicates a DL transmission or if a DL allocation is configured:
3> start the drx-HARQ-RTT-TimerDL for the corresponding HARQ process after the end of the corresponding PUCCH transmission;
3> stop the drx-RetransmissionTimerDL for the corresponding HARQ process.
2> if the PDCCH indicates a UL transmission:
3> start the drx-HARQ-RTT-TimerUL for the corresponding HARQ process after the end of the first reception of the corresponding PUSCH transmission;
3> stop drx-RetransmissionTimerUL for the corresponding HARQ process.
2> if the PDCCH indicates a new transmission (DL or UL):
3> start or restart drx-InactivityTimer.
1> else (That is, when it is not a part of the active time):
2> not transmit type-0-triggered SRS.
1> if CSI masking (csi-Mask) is setup by upper layers:
2> if drx-onDurationTimer is not running:
3> not report CSI on PUCCH.
1> else:
2> if the MAC entity is not in the active time:
3> not report CSI on PUCCH.

--- entity may monitor a PDCCH discontinuously using a DRX operation. Otherwise, a MAC entity must continuously monitor a PDCCH.

RRC controls DRX operation by configuring parameters of DRX configuration information.

If a DRX cycle is configured, an active time includes the following time.

a running time of drx-onDurationTimer or drx-InactivityTimer or drx-RetransmissionTimerDL or drx-RetransmissionTimerUL or ra-ContentionResolutionTimer; or a time a scheduling request was transmitted on a PUCCH and is pending; or a time when a PDCCH indicating new transmission to a C-RNTI of a MAC entity is not received after success- Regardless of whether the MAC entity monitors the PDCCH or not, the MAC entity sends HARQ feedback and type-1-triggered SRS when expected.

If it is not a complete PDCCH time point (i.e., if the active time starts or expires in the middle of the PDCCH time point), the MAC entity does not need to monitor a PDCCH.

In this specification, the wording "configuration or definition" may be interpreted as being (pre)configured (via predefined signaling (e.g., SIB, MAC signaling, RRC signaling)) from a base station or network. For example, "A may be configured" may include "(pre)configuring/defining or notifying A of a base station or network for a UE". Alternatively, the wording "configure or define" may be interpreted as being previously configured or defined by the system. For example, "A may be configured" may include "A is configured/defined in advance by the system".

Meanwhile, in various embodiments of the present disclosure, a transmitting UE (i.e., TX UE) may be a UE which transmits data to (target) receiving UE(s) (i.e., RX UE(s)). For example, the TX UE may be a UE which performs PSCCH transmission and/or PSSCH transmission. For example, the TX UE may be a UE which transmits SL CSI-RS(s) and/or a SL CSI report request indication to (target) RX UE(s). For example, the TX UE may be a UE which transmits a (pre-defined) reference signal(s) (e.g., PSSCH demodulation reference signal (DM-RS)) and/or SL (L1) RSRP report request indicator, which is/are used for SL (L1) RSRP measurement, to (target) to RX UE(s). For example, the TX UE may be a UE which transmits a (control) channel (e.g., PSCCH, PSSCH, etc.) and/or reference signal(s) (e.g., DM-RS(s), CSI-RS(s), etc.) through the (control) channel, which is/are used for SL radio link monitoring (RLM) operation(s) and/or SL radio link failure (RLF) operation(s) of (target) RX UE(s).

Meanwhile, in various embodiments of the present disclosure, a receiving UE (i.e., RX UE) may be a UE which transmits SL HARQ feedback to transmitting UE(s) (i.e., TX UE(s)), based on whether or not data transmitted by TX UE(s) is decoded successfully and/or whether or not a PSCCH (related to PSSCH scheduling) transmitted by TX UE(s) is detected/decoded successfully. For example, the RX UE may be a UE which performs SL CSI transmission to TX UE(s) based on SL CSI-RS(s) and/or a SL CSI report request indication received from TX UE(s). For example, the RX UE may be a UE which transmits, to TX UE(s), an SL (L1) RSRP measurement value measured based on (pre-defined) reference signal(s) and/or SL (L1) RSRP report request indication received from TX UE(s). For example, the RX UE may be a UE which transmits its own data to TX UE(s). For example, the RX UE may be a UE which performs SL RLM operation(s) and/or SL RLF operation(s) based on a (pre-configured) (control) channel and/or reference signal(s) through the (control) channel received from TX UE(s).

Meanwhile, in various embodiments of the present disclosure, when a receiving UE transmits SL HARQ feedback information for a PSSCH and/or PSCCH received from a transmitting UE, the following methods may be considered or partially considered. Here, for example, the corresponding method or partial method may be limitedly applied only when an RX UE successfully decodes/detects a PSCCH scheduling a PSSCH.

option 1: NACK information is transmitted only when PSSCH decoding/reception fails option 2: ACK information is transmitted when PSSCH decoding/reception succeeds, and NACK information is transmitted when PSSCH decoding/reception fails.

Meanwhile, in various embodiments of the present disclosure, for example, a PSCCH may be replaced/substituted with at least one of SCI, first SCI, and/or second SCI. For example, SCI may be mutually replaced/substituted with a PSCCH, first SCI, and/or second SCI. For example, since a TX UE can transmit second SCI to an RX UE through a PSSCH, the PSSCH and the second SCI can be mutually replaced/substituted. For example, when the SCI configuration fields are divided into two groups in consideration of the (relatively) high SCI payload size, the first SCI including the first SCI configuration field group may be referred to as a 1st SCI or 1st-stage SCI, and the second SCI including the second SCI configuration field group may be referred to as a 2nd SCI or 2nd-stage SCI. For example, first SCI may be transmitted through PSCCH. For example, second SCI may be transmitted through an (independent) PSCCH. For example, second SCI may be piggybacked and transmitted together with data through a PSSCH.

Meanwhile, in various embodiments of the present disclosure, for example, "configuration" or "definition" may mean (resource pool specific) (pre)configuration (via pre-defined signaling (e.g., SIB, MAC, RRC, etc.)) from base station or network. For example, "that A is configured" may mean "that a base station/network transmits information related to A to a UE". Or, for example, "that A is configured" may mean "designated through predefined signaling (e.g., PC5 RRC) between UEs".

Meanwhile, in various embodiments of the present disclosure, for example, "RLF" may be mutually expanded and interpreted as at least one of out of synch (OOS) and in synch (IS). Meanwhile, in various embodiments of the present disclosure, for example, a resource block (RB) may be replaced/substituted with a subcarrier, or vice versa. For example, a packet or a traffic may be replaced/substituted with a transport block (TB) or a medium access control protocol data unit (MAC PDU) according to a transmission layer, or vice versa. For example, a code block group (CBG) may be replaced/substituted with a TB, or vice versa. For example, a source ID may be replaced/substituted with a destination ID, or vice versa. For example, an L1 ID may be replaced/substituted with an L2 ID, or vice versa. For example, the L1 ID may be an L1 source ID or an L1 destination ID. For example, the L2 ID may be an L2 source ID or an L2 destination ID.

Meanwhile, in various embodiments of the present disclosure, for example, operation(s) of a TX UE to reserve/select/determine retransmission resource(s) may include operation(s) of the TX UE to reserve/select/determine potential retransmission resource(s) in which actual use is determined based on SL HARQ feedback information received from RX UE(s).

Meanwhile, in various embodiments of the present disclosure, a sub-selection window may be replaced/substituted with a selection window and/or a pre-configured number of resource sets within the selection window, or vice versa.

Meanwhile, in various embodiments of the present disclosure, SL MODE 1 may refer to a resource allocation method or a communication method in which a base station directly schedules SL transmission resource(s) for a TX UE through pre-defined signaling (e.g., DCI or RRC message). For example, SL MODE 2 may refer to a resource allocation method or a communication method in which a UE independently selects SL transmission resource(s) in a resource pool pre-configured or configured from a base station or a network. For example, a UE performing SL communication based on SL MODE 1 may be referred to as a MODE 1 UE or MODE 1 TX UE, and a UE performing SL communication based on SL MODE 2 may be referred to as a MODE 2 UE or MODE 2 TX UE.

Meanwhile, in various embodiments of the present disclosure, for example, a dynamic grant (DG) may be replaced/substituted with a configured grant (CG) and/or a semi-persistent scheduling (SPS) grant, or vice versa. For example, the DG may be replaced/substituted with a combination of the CG and the SPS grant, or vice versa. For example, the CG may include at least one of a configured grant (CG) type 1 and/or a configured grant (CG) type 2.

Meanwhile, in various embodiments of the present disclosure, a channel may be replaced/substituted with a signal, or vice versa. For example, transmission/reception of a channel may include transmission/reception of a signal. For example, transmission/reception of a signal may include transmission/reception of a channel. For example, cast may be replaced/substituted with at least one of unicast, group-cast, and/or broadcast, or vice versa. For example, a cast type may be replaced/substituted with at least one of unicast, groupcast, and/or broadcast, or vice versa.

Meanwhile, in various embodiments of the present disclosure, a resource may be replaced/substituted with a slot or a symbol, or vice versa. For example, the resource may include a slot and/or a symbol.

Meanwhile, in various embodiments of the present disclosure, a priority may be replaced/substituted with at least one of logical channel prioritization (LCP), latency, reliability, minimum required communication range, prose per-packet priority (PPPP), sidelink radio bearer (SLRB), a QoS profile, a QoS parameter, and/or requirement, or vice versa.

Meanwhile, in various embodiments of the present disclosure, for example, for convenience of description, a (physical) channel used when a RX UE transmits at least one of the following information to a TX UE may be referred to as a PSFCH.

SL HARQ feedback, SL CSI, SL (L1) RSRP

Meanwhile, when performing sidelink communication, a method for a transmitting UE to reserve or pre-determine transmission resource(s) for receiving UE(s) may be representatively as follows.

For example, the transmitting UE may perform a reservation of transmission resource(s) based on a chain. Specifically, for example, if the transmitting UE reserves K transmission resources, the transmitting UE may transmit location information for less than K transmission resources to receiving UE(s) through a SCI transmitted to the receiving UE(s) at any (or specific) transmission time or a time resource. That is, for example, the SCI may include location information for less than the K transmission resources. Alternatively, for example, if the transmitting UE reserves K transmission resources related to a specific TB, the transmitting UE may transmit location information for less than K transmission resources to receiving UE(s) through a SCI transmitted to the receiving UE(s) at any (or specific) transmission time or a time resource. That is, the SCI may include location information for less than the K transmission resources. In this case, for example, it is possible to prevent performance degradation due to an excessive increase in payloads of the SCI, by signaling only the location information for less than K transmission resources to the receiving UE(s) through one SCI transmitted at any (or specific) transmission time or the time resource by the transmitting UE.

Figure 11:
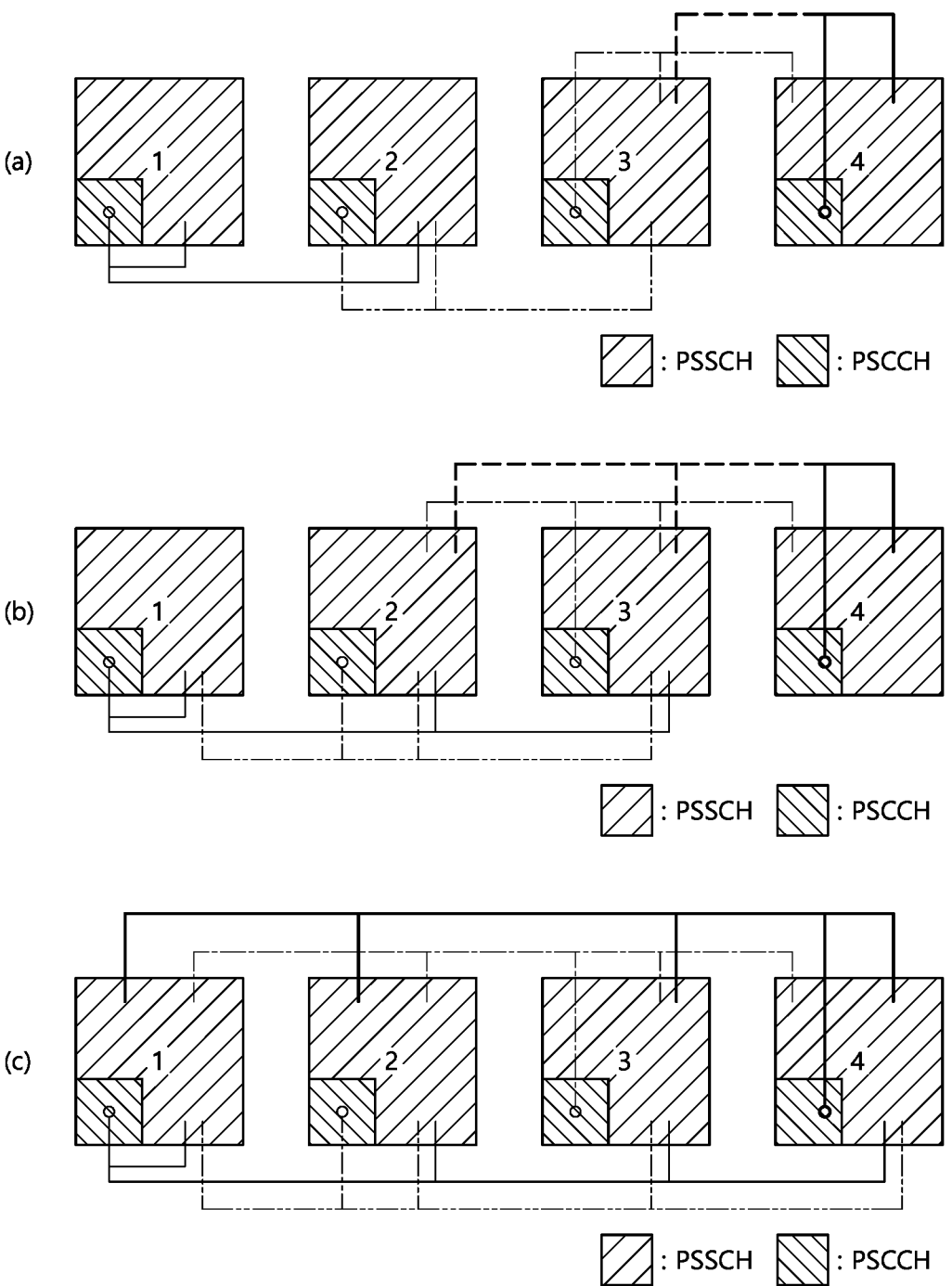
FIG. 11 shows a method in which a UE that has reserved transmission resource(s) informs another UE of the transmission resource(s), based on an embodiment of the present disclosure.

FIG. 11 shows a method in which a UE that has reserved transmission resource(s) informs another UE of the transmission resource(s), based on an embodiment of the present disclosure. The embodiment of FIG. 11 may be combined with various embodiments of the present disclosure.

Specifically, for example, (a) of FIG. 11 shows a method for performing by a transmitting UE chain-based resource reservation by transmitting/signaling location information of (maximum) 2 transmission resources to receiving UE(s) through one SCI, in the case of a value of K=4. For example, (b) of FIG. 11 shows a method for performing by a transmitting UE chain-based resource reservation by transmitting/signaling location information of (maximum) 3 transmission resources to receiving UE(s) through one SCI, in the case of a value of K=4. For example, referring to (a) and (b) of FIG. 11, the transmitting UE may transmit/signal only location information of the fourth transmission-related resource to the receiving UE(s) through the fourth (or last) transmission-related PSCCH. For example, referring to (a) of FIG. 11, the transmitting UE may transmit/signal to the receiving UE(s) not only location information of the fourth transmission-related resource but also location information of the third transmission-related resource additionally through the fourth (or last) transmission-related PSCCH. For example, referring to (b) of FIG. 11, the transmitting UE may transmit/signal to the receiving UE(s) not only location information of the fourth transmission-related resource but also location information of the second transmission-related resource and location information of the third transmission-related resource additionally through the fourth (or last) transmission-related PSCCH. In this case, for example, in (a) and (b) of FIG. 11, if the transmitting UE may transmit/signal to the receiving UE(s) only location information of the fourth transmission-related resource through the fourth (or last) transmission-related PSCCH, the transmitting UE may configure or designate a field/bit of location information of unused or remaining transmission resource(s) to a pre-configured value (e.g., 0). For example, in (a) and (b) of FIG. 11, if the transmitting UE may transmit/signal to the receiving UE(s) only location information of the fourth transmission-related resource through the fourth (or last) transmission-related PSCCH, the transmitting UE may be configured or designate a field/bit of location information of unused or remaining transmission resource(s) to a pre-configured status/bit value indicating/representing the last transmission (among 4 transmissions).

Meanwhile, for example, the transmitting UE may perform a reservation of transmission resource(s) based on a block. Specifically, for example, if the transmitting UE reserves K transmission resources, the transmitting UE may transmit location information for K transmission resources to receiving UE(s) through a SCI transmitted to the receiving UE(s) at any (or specific) transmission time or a time resource. That is, the SCI may include location information for K transmission resources. For example, if the transmitting UE reserves K transmission resources related to a specific TB, the transmitting UE may transmit location information for K transmission resources to receiving UE(s) through a SCI transmitted to the receiving UE(s) at any (or specific) transmission time or a time resource. That is, the SCI may include location information for K transmission resources. For example, (c) of FIG. 11 shows a method for performing by the transmitting UE block-based resource reservation, by signaling location information of 4 transmission resources to receiving UE(s) through one SCI, in the case of a value of K=4.

According to an embodiment of the present disclosure, if a (transmitting) UE performing packet transmission (and/or transmission resource (re)selection) performs a power saving operation (and/or SL DRX operation) (and/or if a transmission packet is targeted to a (receiving) UE performing (at least) a power saving operation (and/or SL DRX operation)), the (transmitting) UE may be configured to perform a resource (re)selection operation (and/or required sensing operation) according to (some of) the rules below. In the present disclosure, for example, for ease of description, the (transmitting or receiving) UE performing a power saving operation (and/or an SL DRX operation) is referred to as a "P-UE". For example, (some of) the following rules may be configured to apply (only) if a (transmitting) UE performing a packet transmission (and/or transmission resource (re)selection) is a P-UE.

Alternatively, for example, the following (partial) rule may be configured to apply to a case where a target (receiving) UE of a transport packet is a P-UE, a case in which the remaining PDB value related to a transport packet is greater than (or less than) a pre-configured threshold; a case in which a partial sensing operation (and/or random resource selection operation (and/or full sensing operation)) is allowed/configured (or not allowed/unconfigured) on a resource pool, a case in which periodic resource reservation operation (and/or aperiodic resource reservation operation) is allowed/configured (or allowed/not configured) on a resource pool; a case in which packets (LCH or service-related) with a priority higher than (or lower than) a pre-configured threshold level are transmitted; a case in which packets related to QOS requirements (e.g., latency, reliability, minimum communication range) of a pre-configured threshold or higher (or lower) are transmitted; and/or a case where the congestion level (e.g., CBR) in the resource pool is higher (or lower) than a pre-configured threshold.

According to an embodiment of the present disclosure (proposed method #1), if, at a certain time point (within an inactive time interval) (e.g., SLOT #N), (transmission) data (data) has arrived/exists on the buffer (and/or LCH), a P-UE may be configured to determine a (position and/or (minimum, maximum, or average) size/length of) a selection window (SEL_WIN) in which transmission resource (re) selection is performed and/or a (position and/or (minimum, maximum, or average) size/length of) a window (ST_SENWIN) related to a sensing operation (ST_SE-NOPT) required for transmission resource (re)selection according to (some of) the following pre-configured methods.

Here, for example, if option 1 (and/or option 2) is applied, it may be interpreted as a form where the triggering time point of transmission resource (re)selection (and/or the associated ST_SENWIN (and/or SEL_WIN)) is (all) shifted within the active time period, and/or a form where the triggering time point of transmission resource (re)selection is (still) located within the inactive time period, but only the associated ST_SENWIN (and/or SEL_WIN) is shifted into the active time period.

Further, for example, "SLOT #N" in the present disclosure may be further interpreted as the time at which transmission resource (re)selection is triggered (and/or the time at which the (transmitted) data arrives/exists in the buffer (and/or LCH)). For example, in the present disclosure, "active time" may be interpreted (extended) as the (time) period during which a P-UE performs (blind) reception/decoding operations of PSCCH (and/or PSSCH and/or PSFCH and/or SL SSB), on the other hand, "inactive time" may be interpreted as the (time) period during which a P-UE does not perform (blind) reception/decoding of PSCCH (and/or PSSCH and/or PSFCH and/or SL SSB).

For example, according to the option 1 above, a UE may shift ST_SENWIN (related to the required sensing operation) and the SEL_WIN (in which transmission resource (re)selection is performed and/or a candidate (transport) resource (set) for (re)selection exists) into an active time interval (VAL_ACTWIN) that appears/exists after the SLOT #N time point (and/or after a pre-configured offset value from the SLOT #N time point). After then, based on this, ST_SENOPT operation and transmission resource (re)selection operation may be configured to be performed.

For example, according to the option 2 above, a UE may be configured to perform transmission resource (re)selection operation by shifting only SEL_WIN (in which the transmission resource (re)selection is performed and/or a candidate (transmission) resource (set) for (re)selection exists) into active time period (VAL_ACTWIN) that appears/exists after the SLOT #N time point (and/or after a pre-configured offset value from the SLOT #N time point), and then, based thereon, perform transmission resource (re)selection operation.

Figure 12:
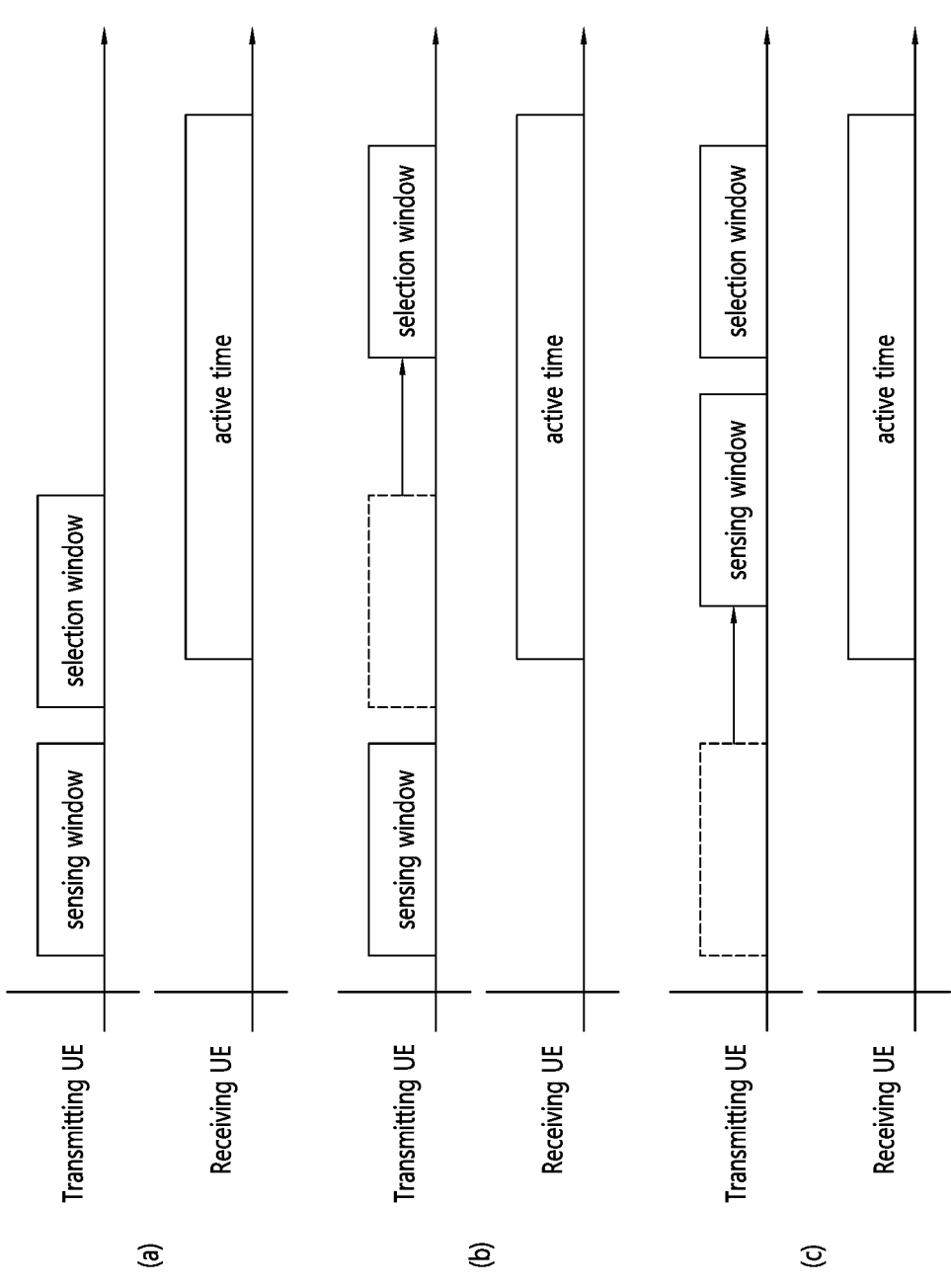
FIG. 12 shows an example of shifting a sensing window and/or a selection window, according to an embodiment of the present disclosure.

FIG. 12 shows an example of shifting a sensing window and/or a selection window, according to an embodiment of the present disclosure. The example of FIG. 12 may be combined with various embodiments of the present disclosure.

Referring to FIG. 12, a sensing window and a selection window of a transmitting UE are shown in (a) of FIG. 12. Here, the sensing window and the selection window may not be included within an active time related to an SL DRX configuration of a receiving UE performing an SL DRX operation. In (b) of FIG. 12, a sensing window and a selection window of a transmitting UE are shown. Here, according to an embodiment of the present disclosure, the selection window may be determined in a shifted form to be included within an active time related to an SL DRX configuration of a receiving UE performing an SL DRX operation. In (c) of FIG. 12, a sensing window and a selection window of a transmitting UE are shown. Here, according to an embodiment of the present disclosure, the sensing window and the selection window may be determined in a shifted form such that they are both included within an active time related to an SL DRX configuration of a receiving UE performing an SL DRX operation.

According to an embodiment of the present disclosure (Proposed Method #2), Option 1 (and/or Option 2) in Proposed Method #1 may be configured to apply only if (some of) the following conditions are satisfied (where VAL_ACTWIN exists). For example, option 1 may be configured to apply if both conditions 1 and 2 are satisfied, and option 2 may be configured to apply, if condition 1 is satisfied and the size/length of VAL_ACTWIN can include the (minimum, maximum, or average) size/length of SEL_WIN, but cannot (additionally) include the (minimum, maximum, or average) size/length of ST_SENWIN.

Here, for example, in the latter case (i.e., a situation where Option 2 applies), a UE may be configured to perform (some) of the required ST_SENOPT operations (and/or the remainder excluding any portion of the (minimum, maximum, or average) size/length of ST_SENWIN that may be (additionally) included within the size/length of VAL_ACTWIN) within an inactive time interval (in the form of a pre-configured pattern).

Furthermore, for example, a P-UE may be configured to omit transmission (and/or not trigger the (associated) transmission resource (re)selection) of (transmission) data (that has arrived/exists in the buffer (and/or on the LCH)) at SLOT #N time point within an inactive time period if there is no VAL_ACTWIN for which (any or all) of the conditions below are satisfied.

Condition 1) For example, if the interval between the SLOT #N time point and (start and/or end of) the VAL_ACTWIN time point is greater than (and/or equal to) the remaining PDB value related to a transmission packet.

Condition 2) For example, if the (minimum, maximum, or average) size/length of a VAL_ACTWIN is greater than (and/or equal to) the (minimum, maximum, or average) size/length of an ST_SENWIN (as required by a pre-configured priority) (and/or the (minimum, maximum, or average) size/length of SEL_WIN (as required by pre-configured priority) and/or the sum of the (minimum, maximum, or average) size/length of ST_SENWIN and SEL_WIN (as required by pre-configured priority)).

For example, whether or not the rule applies (and/or the parameter values related to the proposed method/rules of this disclosure) may be specifically (or, differently, or, independently) configured/allowed (and/or the application of the rule may be limited) for at least one of elements/parameters such as service type (and/or (LCH or service) priority and/or QOS requirements (e.g., latency, reliability, minimum communication range) and/or PQI parameters) (and/or HARQ feedback enabled (and/or disabled)) LCH/MAC PDU (transmission) and/or the CBR measurement value of a resource pool and/or the SL cast type (e.g., unicast, groupcast, broadcast) and/or the SL groupcast HARQ feedback options (e.g., NACK only feedback, ACK/NACK feedback, TX-RX distance-based NACK only feedback) and/or the SL MODE 1 CG type (e.g., SL CG type 1/2) and/or SL mode type (e.g., mode 1/2) and/or whether a resource pool and/or PSFCH resource is configured and/or if periodic resource reservation operation (and/or aperiodic resource reservation operation) is allowed/enabled (or not allowed/enabled) on a resource pool and/or if partial sensing operation (and/or random resource selection operation (and/or full sensing operation)) is allowed/enabled (or not allowed/enabled) on a resource pool and/or source (L2) ID (and/or destination (L2) ID) and/or PC5 RRC connection (link) and/or SL link and/or connection state (with base station) (e.g., RRC CONNECTED state, IDLE state, INACTIVE state) and/or the SL HARQ process (ID) and/or whether the SL DRX operation (of a transmitting or receiving UE) is performed and/or whether a UE is power saving (transmitting or receiving) UE and/or (from the perspective of a particular UE) a case in which a PSFCH transmission and PSFCH RX (and/or multiple PSFCH transmissions (beyond UE capability)) overlap (and/or PSFCH transmission (and/or PSFCH reception) is omitted) and/or a case in which a receiving UE actually (successfully) receives a PSCCH (and/or PSSCH) (re)transmission from a transmitting UE and/or a case in which a (transmitting) UE performing packet transmission (and/or transmission resource (re)selection) performs a power saving operation (and/or SL DRX operation), and/or the target (receiving) UE of the transmitted packet performs a power saving operation (and/or SL DRX operation) and/or a case in which the remaining PDB value related to the transmission packet is above (or below) a pre-configured threshold.

In addition, the wording "configuration" (or "designation") in this disclosure may be expansively interpreted to mean that a base station informs a UE over a predefined (physical layer or higher layer) channel/signal (e.g., SIB, RRC, MAC CE), and/or that it is provided through a pre-configuration, and/or that a UE informs another UE over a predefined (physical layer or higher layer) channel/signal (e.g., SL MAC CE, PC5 RRC).

Further, in this disclosure, the wording "PSFCH" may be (mutually) expansively interpreted as "(NR or LTE) PSSCH (and/or (NR or LTE) PSCCH) (and/or (NR or LTE) SL SSB (and/or UL channel/signal))".

Furthermore, the proposed methods of the present disclosure may be used in combination with each other and extended (in new forms). Further, in this disclosure, the "active time" (and/or "on-duration") may be interpreted ("mutually") as "on-duration" (and/or "active time").

FIG. 13 shows a procedure for a first device to perform wireless communication, according to an embodiment of the present disclosure. The embodiment of FIG. 13 may be combined with various embodiments of the present disclosure.

Referring to FIG. 13, in step S1310, a first device may determine a sensing window. In step S1320, the first device may determine a selection window to be included within an active time of a sidelink (SL) discontinuous reception (DRX) configuration related to an SL DRX operation of a second device. In step S1330, the first device may select a resource for an SL transmission, within the selection window, based on sensing performed within the sensing window. In step S1340, the first device may transmit, to the second device, sidelink control information (SCI) for scheduling a physical sidelink shared channel (PSSCH) through a physical sidelink control channel (PSCCH), based on the resource. In step S1350, the first device may transmit, to the second device, SL data through the PSSCH, based on the resource.

For example, a part or all of the sensing window may be determined not to be included within the active time.

For example, time between a triggering time point of resource selection for the SL transmission and a starting time point of the active time may be greater than or equal to packet delay budget (PDB) related to the SL data, the selection window may be included within the active time, and a length of the active time may be longer than a sum of a length of the sensing window and a length of the selection window.

For example, a part not included within the active time of the sensing window may be included within an inactive time of the SL DRX configuration, and the sensing may be performed within the part, of the sensing window, included within the inactive time.

For example, the sensing window may be determined to be included within the active time.

For example, the selectin window or the sensing window may be determined to be located after a triggering time point of resource selection for the SL transmission, by an offset value.

For example, time between a triggering time point of resource selection for the SL transmission and a starting time point of the active time may be greater than or equal to PDB related to the SL data.

For example, a length of the active time may be longer than or equal to a length of the sensing window.

For example, the length of the active time may be longer than or equal to a sum of the length of the sensing window and a length of the selection window.

For example, the sensing window may be determined to be included within the active time, based on a triggering time point of resource selection for the SL transmission and a starting time point of the active time being greater than or equal to PDB related to the SL data, and a length of the active time being longer than equal to a length of the sensing window.

For example, a length of the sensing window may be determined based on a priority of the SL data.

For example, a quality of service (QoS) requirement related to the SL data may be higher than a threshold.

For example, congestion level related to a resource pool may be higher than a threshold.

The embodiments described above may be applied to various devices described below. For example, a processor 102 of a first device 100 may determine a sensing window. And, the processor 102 of the first device 100 may determine a selection window to be included within an active time of a sidelink (SL) discontinuous reception (DRX) configuration related to an SL DRX operation of a second device 200. And, the processor 102 of the first device 100 may select a resource for an SL transmission, within the selection window, based on sensing performed within the sensing window. And, the processor 102 of the first device 100 may control a transceiver 106 to transmit, to the second device 200, sidelink control information (SCI) for scheduling a physical sidelink shared channel (PSSCH) through a physical sidelink control channel (PSCCH), based on the resource. And, the processor 102 of the first device 100 may control the transceiver 106 to transmit, to the second device 200, SL data through the PSSCH, based on the resource.

According to an embodiment of the present disclosure, a first device for performing wireless communication may be proposed. For example, the first device may comprise: one or more memories storing instructions; one or more transceivers; and one or more processors connected to the one or more memories and the one or more transceivers. For example, the one or more processors may execute the instructions to: determine a sensing window; determine a selection window to be included within an active time of a sidelink (SL) discontinuous reception (DRX) configuration related to an SL DRX operation of a second device; select a resource for an SL transmission, within the selection window, based on sensing performed within the sensing window; transmit, to the second device, sidelink control information (SCI) for scheduling a physical sidelink shared channel (PSSCH) through a physical sidelink control channel (PSCCH), based on the resource; and transmit, to the second device, SL data through the PSSCH, based on the resource.

According to an embodiment of the present disclosure, a device adapted to control a first user equipment (UE) may be proposed. For example, the device may comprise: one or more processors; and one or more memories operably connectable to the one or more processors and storing instructions. For example, the one or more processors may execute the instructions to: determine a sensing window; determine a selection window to be included within an active time of a sidelink (SL) discontinuous reception (DRX) configuration related to an SL DRX operation of a second UE; select a resource for an SL transmission, within the selection window, based on sensing performed within the sensing window; transmit, to the second UE, sidelink control information (SCI) for scheduling a physical sidelink shared channel (PSSCH) through a physical sidelink control channel (PSCCH), based on the resource; and transmit, to the second UE, SL data through the PSSCH, based on the resource.

According to an embodiment of the present disclosure, a non-transitory computer-readable storage medium storing instructions may be proposed. For example, the instructions, when executed, may cause a first device to: determine a sensing window; determine a selection window to be included within an active time of a sidelink (SL) discontinuous reception (DRX) configuration related to an SL DRX operation of a second device; select a resource for an SL transmission, within the selection window, based on sensing performed within the sensing window; transmit, to the second device, sidelink control information (SCI) for scheduling a physical sidelink shared channel (PSSCH) through a physical sidelink control channel (PSCCH), based on the resource; and transmit, to the second device, SL data through the PSSCH, based on the resource.

FIG. 14 shows a procedure for a second device to perform wireless communication based on a sidelink (SL) discontinuous reception (DRX) configuration, according to an embodiment of the present disclosure. The embodiment of FIG. 14 may be combined with various embodiments of the present disclosure.

Referring to FIG. 14, in step S1410, a second device may receive, from a first device, sidelink control information (SCI) for scheduling a physical sidelink shared channel (PSSCH) through a physical sidelink control channel (PSCCH), based on a resource for SL transmission. In step S1420, the second device may receive, from the first device, SL data through the PSSCH, based on the resource. For example, the resource may be selected within a selection window included within an active time of the SL DRX configuration, based on sensing performed within a sensing window.

For example, the sensing window may be determined to be included within the active time.

The embodiments described above may be applied to various devices described below. For example, a processor 202 of a second device 200 may control a transceiver 206 to receive, from a first device 100, sidelink control information (SCI) for scheduling a physical sidelink shared channel (PSSCH) through a physical sidelink control channel (PSCCH), based on a resource for SL transmission. And, the processor 202 of the second device 200 may control the transceiver 206 to receive, from the first device 100, SL data through the PSSCH, based on the resource. For example, the resource may be selected within a selection window included within an active time of the SL DRX configuration, based on sensing performed within a sensing window.

According to an embodiment of the present disclosure, a second device for performing wireless communication may be proposed. For example, the second device may comprise: one or more memories storing instructions; one or more transceivers; and one or more processors connected to the one or more memories and the one or more transceivers. For example, the one or more processors may execute the instructions to: receive, from a first device, sidelink control information (SCI) for scheduling a physical sidelink shared channel (PSSCH) through a physical sidelink control channel (PSCCH), based on a resource for SL transmission; and receive, from the first device, SL data through the PSSCH, based on the resource, wherein the resource may be selected within a selection window included within an active time of the SL DRX configuration, based on sensing performed within a sensing window.

For example, the sensing window may be determined to be included within the active time.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 15:
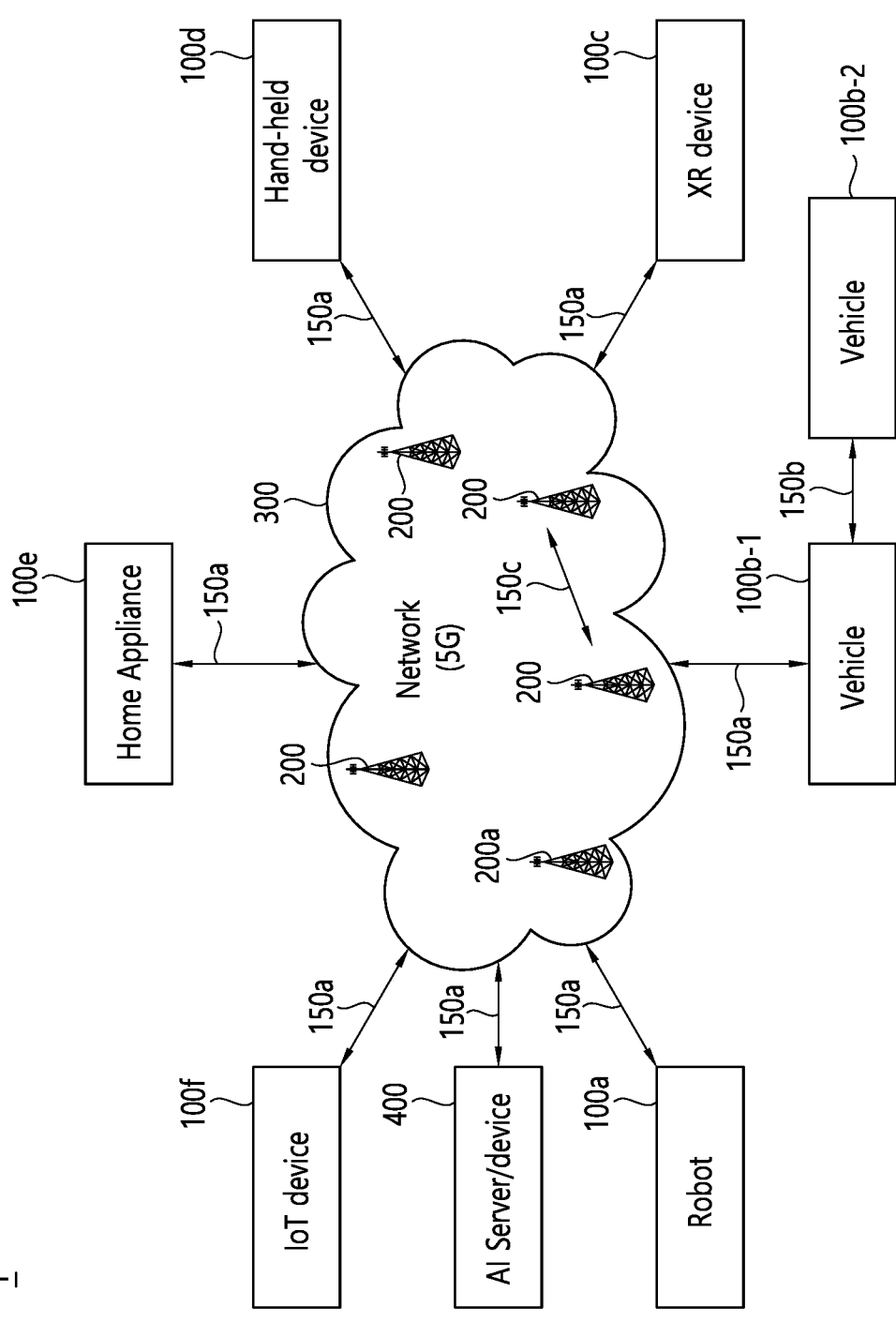
FIG. 15 shows a communication system 1, based on an embodiment of the present disclosure.

FIG. 15 shows a communication system 1, based on an embodiment of the present disclosure. The embodiment of FIG. 15 may be combined with various embodiments of the present disclosure.

Referring to FIG. 15, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smart-pad, a wearable device (e.g., a smartwatch or a smart-glasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 16:
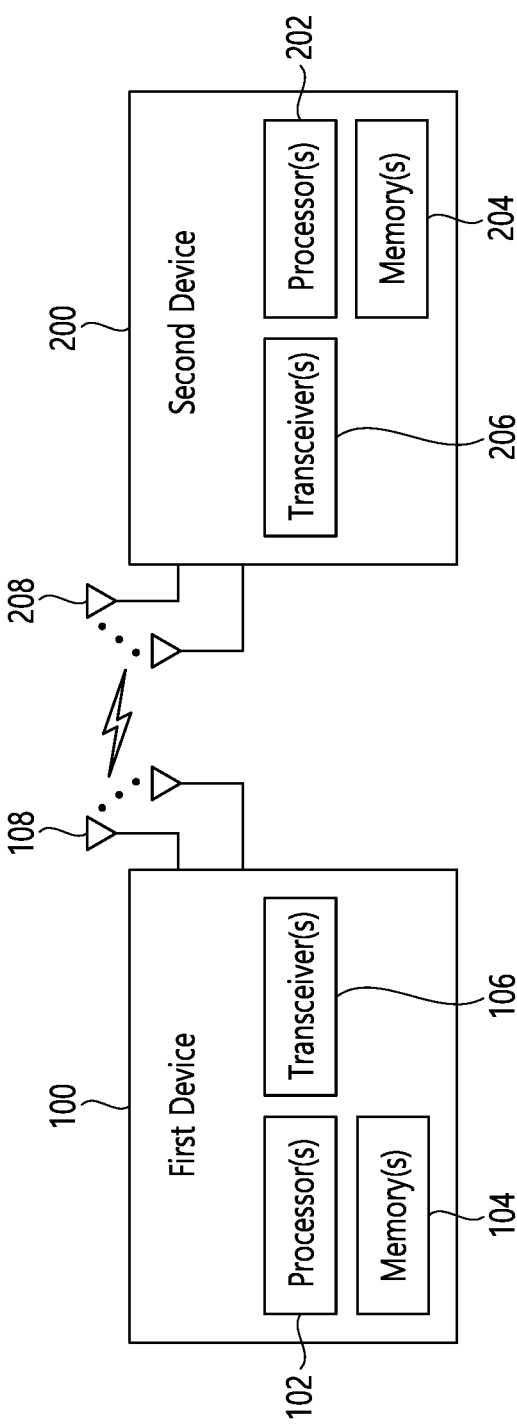
FIG. 16 shows wireless devices, based on an embodiment of the present disclosure.

FIG. 16 shows wireless devices, based on an embodiment of the present disclosure.

Referring to FIG. 16, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 15.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 17:
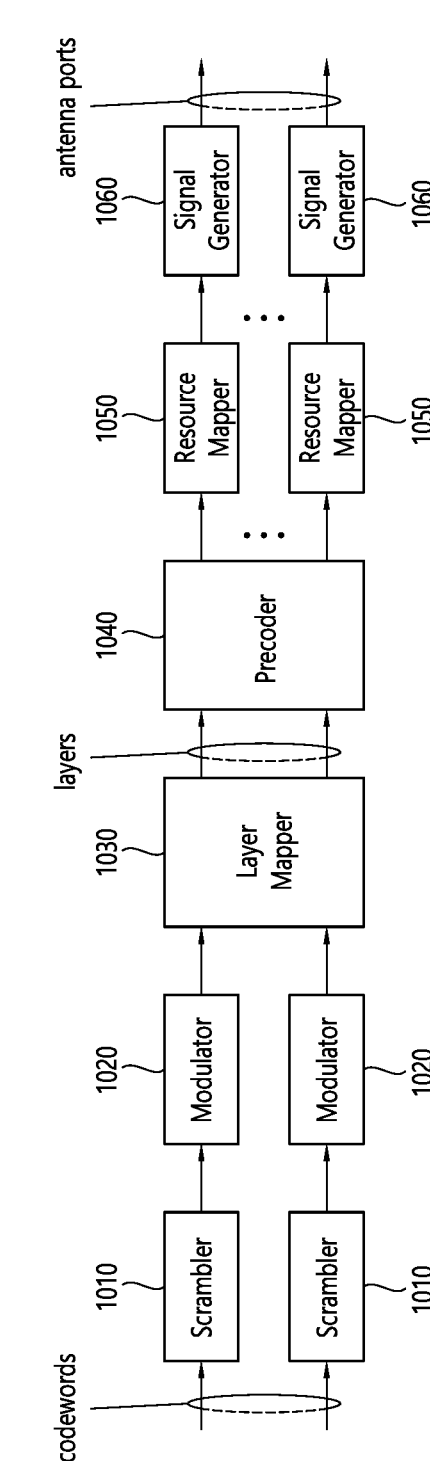
FIG. 17 shows a signal process circuit for a transmission signal, based on an embodiment of the present disclosure.

FIG. 17 shows a signal process circuit for a transmission signal, based on an embodiment of the present disclosure.

Referring to FIG. 17, a signal processing circuit 1000 may include scramblers 1010, modulators 1020, a layer mapper 1030, a precoder 1040, resource mappers 1050, and signal generators 1060. An operation/function of FIG. 17 may be performed, without being limited to, the processors 102 and 202 and/or the transceivers 106 and 206 of FIG. 16. Hardware elements of FIG. 17 may be implemented by the processors 102 and 202 and/or the transceivers 106 and 206 of FIG. 16. For example, blocks 1010 to 1060 may be implemented by the processors 102 and 202 of FIG. 16. Alternatively, the blocks 1010 to 1050 may be implemented by the processors 102 and 202 of FIG. 16 and the block 1060 may be implemented by the transceivers 106 and 206 of FIG. 16.

Codewords may be converted into radio signals via the signal processing circuit 1000 of FIG. 17. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 17. For example, the wireless devices (e.g., 100 and 200 of FIG. 16) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

FIG. 18 shows another example of a wireless device, based on an embodiment of the present disclosure. The wireless device may be implemented in various forms according to a use-case/service (refer to FIG. 15).

Referring to FIG. 18, wireless devices 100 and 200 may correspond to the wireless devices 100 and 200 of FIG. 16 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 16. For example, the transceiver(s) 114 may include the one or more transceivers 106 and 206 and/or the one or more antennas 108 and 208 of FIG. 16. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 15), the vehicles (100b-1 and 100b-2 of FIG. 15), the XR device (100c of FIG. 15), the hand-held device (100d of FIG. 15), the home appliance (100e of FIG. 15), the IoT device (100f of FIG. 15), a digital broadcast terminal, a hologram device, a public safety device, an MTC device, a medicine device, a fintech device (or a finance device), a security device, a climate/environment device, the AI server/device (400 of FIG. 15), the BSs (200 of FIG. 15), a network node, etc. The wireless device may be used in a mobile or fixed place according to a use-example/service.

In FIG. 18, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 18 will be described in detail with reference to the drawings.

Figure 19:
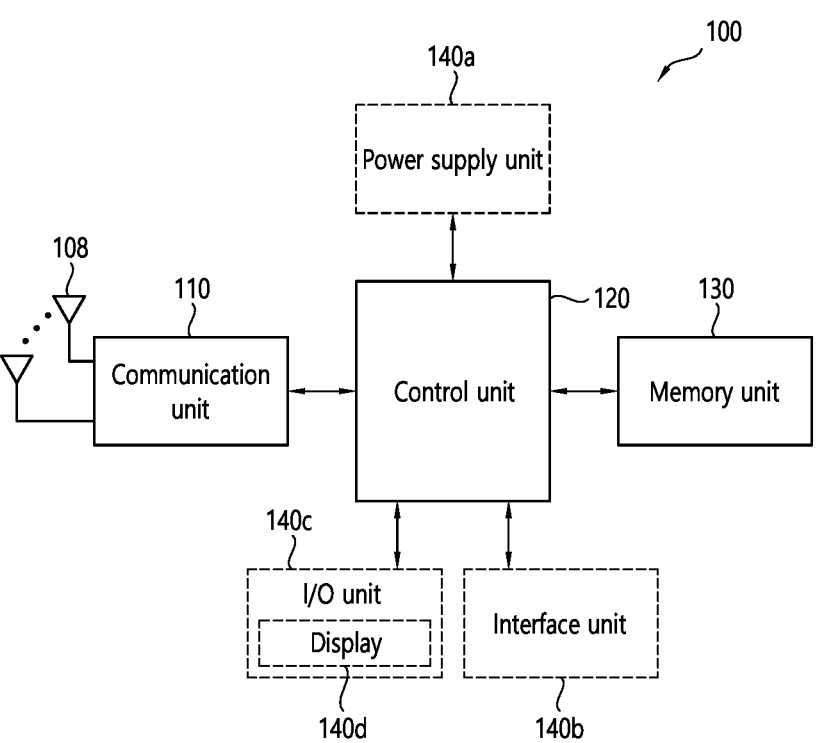
FIG. 19 shows a hand-held device, based on an embodiment of the present disclosure.

FIG. 19 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 19, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 18, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

FIG. 20 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 20, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 18, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method comprising:
obtaining information related to partial sensing in a side-link (SL) discontinuous (DRX) inactive time;
determining a sensing window to have a minimum size for partial sensing, based on the information indicating a first device is to perform the partial sensing in the SL DRX inactive time;
performing the partial sensing on the sensing window in a sidelink (SL) discontinuous reception (DRX) inactive time;
selecting a resource for transmitting SL data, from a candidate resource set, based on the partial sensing;
transmitting, to a second device, sidelink control information (SCI) for scheduling a physical sidelink shared channel (PSSCH) through a physical sidelink control channel (PSCCH), based on the resource; and
transmitting, to the second device, the SL data through the PSSCH, based on the resource.

2. The method of claim 1, wherein a part or all of the sensing window is included within an active time.

3. The method of claim 2, wherein a part not included within the active time of the sensing window is included in the SL DRX inactive time.

4. The method of claim 1, wherein a length of the sensing window is determined based on a priority of the SL data.

5. The method of claim 1, wherein the sensing window is determined to have a minimum size for partial sensing, based on the information indicating the first device is to perform the partial sensing in the SL DRX inactive time and a quality of service (QoS) requirement related to the SL data being higher than a threshold.

6. The method of claim 1, wherein the sensing window is determined to have a minimum size for partial sensing, based on the information indicating the first device is to perform the partial sensing in the SL DRX inactive time and congestion level related to a resource pool being higher than a threshold.

7. A first device comprising:
one or more processors;
one or more transceivers; and
one or more memories connected to the one or more processors and storing instructions,
wherein the instructions, based on being executed by the one or more processors, cause to first device to:
obtain information related to partial sensing in a sidelink (SL) discontinuous (DRX) inactive time;
determine a sensing window to have a minimum size for partial sensing, based on the information indicating a first device is to perform the partial sensing in the SL DRX inactive time;
perform the partial sensing on the sensing window in a sidelink (SL) discontinuous reception (DRX) inactive time:
select a resource for transmitting SL data, from a candidate resource set, based on the partial sensing;
transmit, to a second device, sidelink control information (SCI) for scheduling a physical sidelink shared channel (PSSCH) through a physical sidelink control channel (PSCCH), based on the resource; and
transmit, to the second device, the SL data through the PSSCH, based on the resource.

8. A processing device adapted to control a first device, the processing device comprising:
one or more processors; and
one or more memories connected to the one or more processors and storing instructions,
wherein the instructions, based on being executed by the one or more processors, cause the first device to:
obtain information related to partial sensing in a sidelink (SL) discontinuous (DRX) inactive time:
determine a sensing window to have a minimum size for partial sensing, based on the information indicating a first device is to perform the partial sensing in the SL DRX inactive time;
perform the partial sensing on the sensing window in a sidelink (SL) discontinuous reception (DRX) inactive time;
select a resource for transmitting SL data, from a candidate resource set, based on the partial sensing;
transmit, to a second device, sidelink control information (SCI) for scheduling a physical sidelink shared channel (PSSCH) through a physical sidelink control channel (PSCCH), based on the resource; and
transmit, to the second device, the SL data through the PSSCH, based on the resource.

* * * * *